United States Patent [19]
Bell

[11] Patent Number: 5,101,296
[45] Date of Patent: Mar. 31, 1992

[54] LIGHT-POLARIZING MOSAIC PAIR

[76] Inventor: Bill Bell, 56 Perry St., Brookline, Mass. 02146

[21] Appl. No.: 527,145

[22] Filed: May 22, 1990

[51] Int. Cl.$^5$ .................... G02B 5/30; G02B 27/28
[52] U.S. Cl. ...................... 359/489; 283/90; 359/501
[58] Field of Search ............ 350/132, 396, 407, 352; 273/153 R, 157 A; 283/90

[56] References Cited

U.S. PATENT DOCUMENTS

| | | | |
|---|---|---|---|
| 2,165,974 | 7/1939 | Land | 350/396 |
| 2,218,875 | 10/1940 | Parsell | 350/396 |
| 2,359,457 | 10/1944 | Young | 350/396 |
| 2,397,272 | 3/1946 | Land | 350/396 |
| 3,054,204 | 2/1962 | Yates | 350/296 |
| 3,348,217 | 10/1967 | Snaper | 350/396 |
| 3,497,979 | 3/1970 | Buitkus | 350/396 |
| 3,857,627 | 12/1974 | Harsch | 350/396 |
| 3,857,628 | 12/1974 | Strong | 350/396 |
| 3,964,749 | 6/1976 | Wadsworth | 273/157 |
| 4,491,326 | 1/1985 | Halsey | 273/157 |
| 4,504,084 | 3/1985 | Jauch | 283/94 |
| 4,512,581 | 4/1985 | Levine | 273/153 |
| 4,586,711 | 5/1986 | Winters et al. | 273/138 |
| 4,605,231 | 9/1986 | Richman | 273/157 |
| 4,682,954 | 7/1987 | Cook | 380/154 |

FOREIGN PATENT DOCUMENTS

| | | | |
|---|---|---|---|
| 152748 | 3/1938 | Australia | 350/396 |
| 56-033678 | 4/1981 | Japan | 350/396 |

OTHER PUBLICATIONS

Phillips, "Advanced Technology: PLZT Ceramics", Information Display, Apr., 1989, pp. 11-13.

*Primary Examiner*—Bruce Y. Arnold
*Assistant Examiner*—Martin Lerner
*Attorney, Agent, or Firm*—Fish & Richardson

[57] ABSTRACT

Information in binary form is stored in a planar array or mosaic of light-polarizing cells, wherein each cell may have two distinct orientations of the axis of polarization. For example, binary "1" may be denoted by setting the axis of polarization in any cell to the vertical, and binary "0" by setting the axis to horizontal. Binary data so stored are invisible to the naked eye, but will become visible as a pattern of light and dark spots when viewed through a second polarizer. A unique property of light-polarizing mosaics is that when two such mosaics are laid one atop the other in precise registration, the resulting visible pattern of light and dark spots portrays the modulo-two sum (also known as the "exclusive or" product) of the two sets of binary information stored therein. If the binary data stored in one such mosaic were data created by modulo-two addition of a set of intelligible data with a set of random data, and if this same set of random data were stored in a second such mosaic, the original data will become immediately visible in its intelligible form merely by overlaying the two mosaics.

25 Claims, 35 Drawing Sheets

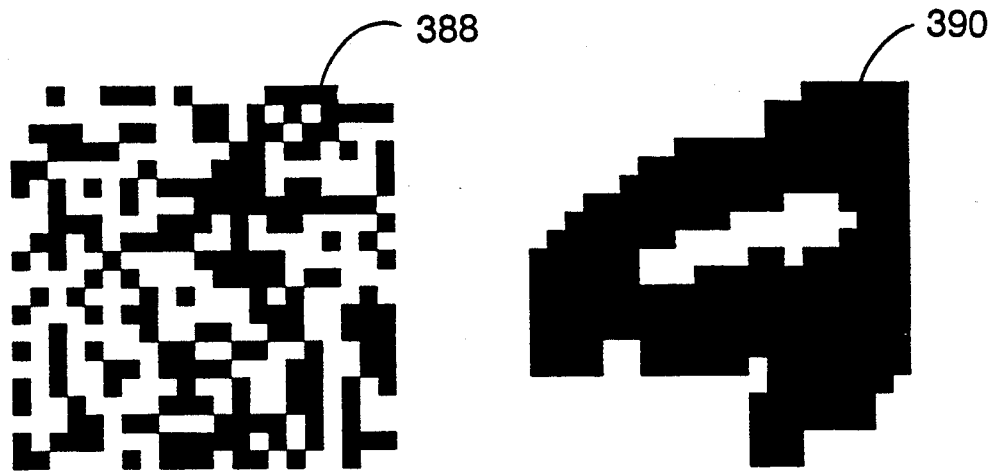
FIG. 29
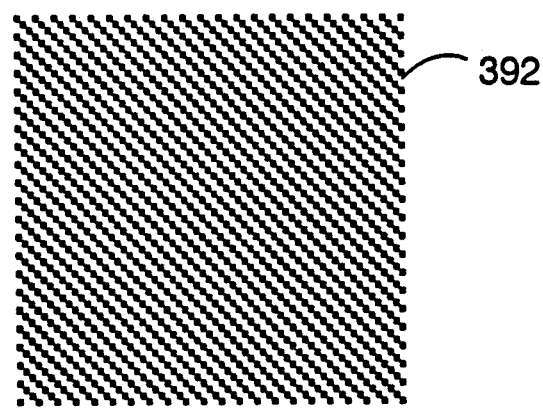
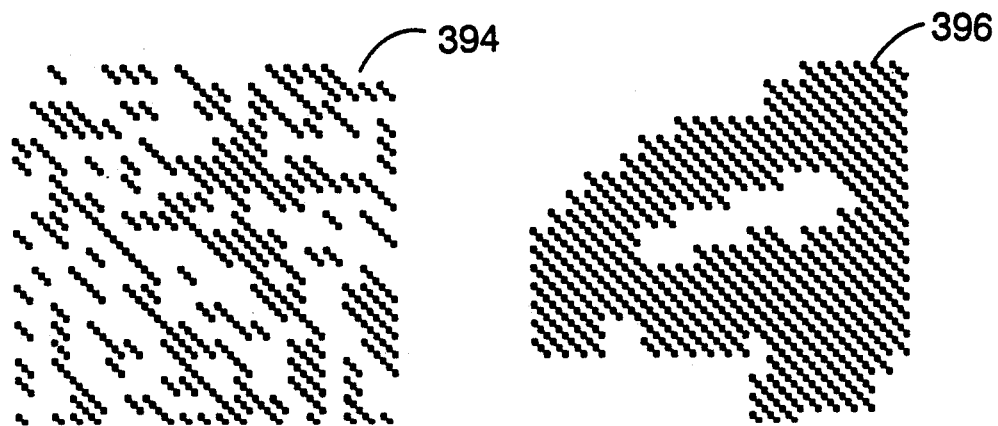

LIGHT-POLARIZING MOSAIC PAIR

BACKGROUND OF THE INVENTION

This invention relates to using optical properties of a medium to represent information.

One such use is shown in U.S. Pat. No. 4,682,954 (Richard C. Cook, inventor) which describes a method for enciphering and deciphering printed text and graphic matter by forming a modulo-two sum with a printed random key using a multi-step photographic or photocopy process to decipher. Cook employs numerous clear (light transmitting) regions and opaque (light absorbing) regions on two transparencies to represent binary information derived from light and dark regions in original printed matter.

U.S. Pat. No. 4,586,711 "Matching Card Game Employing Randomly-Coded Monochromatic Images" (Simon N. Winters and Yiu T. Chu, inventors) describes a system in which a message is hidden in a pair of images having clear and opaque regions and is recovered by overlaying one image on the other. The image to be hidden is masked by a process that in effect "paints" over the black areas of the image with a random fine-grain black-and-white "paint", and "paints" over the white areas of the image with another random fine-grain black-and-white "paint" that has a mathematically different but visually similar statistical behavior from the first "paint". The matching overlay, which must be on a transparency, is prepared in the Winters/Chu process by inverting the random "paint" over the black areas so that when the two images are overlaid, the black portions of the original image will appear solid black in the overlaid pair. The white portions of the original image are recorded in the matching overlay as before, but using a different and unrelated random pattern in the "paint". Therefore, the white portions of the original will appear in the overlaid pair as the sum of two random "paints", namely a dark gray.

SUMMARY OF THE INVENTION

The invention concerns a process of forming the modulo-two sum of two sets of binary information recorded on two transparent sheets by means of regulating the light transmission through the two sheets in combination. The invention pertains also to the production of coherent visible images by the superposition of two unintelligible and invisible images.

This invention shows how two arrays of light-polarizing cells can be employed to store two sets of binary data and shows how two such arrays when overlaid will display the modulo-two sum of the two sets of data in a manner directly perceivable by the eye.

This invention can be used for making novel works of art, eye-catching visual displays, and spatially directed visual signals; it can be used for making cards having hidden messages, and for matching card games and lotteries; it can be used as a mark of certification or authenticity.

This invention can be used as the basis for a particularly difficult form of jigsaw puzzle having two layers, where the image of the puzzle remains unseen until the individual puzzle pieces in each layer are properly placed with respect to each other.

This invention can be used to display one image when the two mosaics are aligned, and display a second, unrelated image when the mosaics are shifted by only one pixel in a given direction. It thus becomes feasible to display different images to each eye, creating a 3-D effect without polarizing glasses or screens.

In general, in one respect, the invention features representing a first (e.g., random) set of values as orientations of polarization axes of a first group of polarizing elements, and representing a second set of values as orientations of polarization axes of a second group of polarizing elements. The second set of values is derived from the first set of values and from corresponding values of a third set (e.g., image values) in a manner such that when the first group of polarizing elements and corresponding elements of the second group are superimposed, a visible pattern appears.

Preferred embodiments of the invention include the following features. The two groups of polarizing elements are square elements arranged in rows and columns on two transparent sheets. The value of each bit is represented by orienting the polarization axis in either of two perpendicular directions. Each value in the second set is derived by modulo-two addition of the corresponding values of the first and third sets.

In some embodiments, one or both groups of polarizing elements are formed as electrically controllable liquid crystals, or as mosaics of polarizing pieces mounted on a transparent substrate, or as a polarizing region formed by a photographic process on a transparent film. In some embodiments, the elements of the two groups are of the same sizes and shapes; in some other embodiments, the shapes are the same but the sizes are scaled. In the latter case the two groups are supported in two spaced apart planes. In some embodiments, the two groups are formed on two transparent cylinders.

The sheets on which the elements are formed may be precut to form puzzle-like pieces.

Multiple images can be multiplexed within cells so that different images become visible depending on the registration of the two groups of elements.

Gray-scale images may be obtained using a range of polarization angles. Color images may be formed using retarder materials. Motion picture and stereoscopic effects may be achieved.

In general, in other aspects, the invention features one of the mozaics; and a puzzle, e.g., one formed on a computer display device.

The invention is simple to implement, and effective in encoding and decoding images. For decoding it requires nothing more than bringing the two sheets of polarizing elements into registration. The encoding is highly effective because the patterns on the two sheets are essentially random.

Other advantages and features will become apparent from the following description of the preferred embodiments and from the claims.

BRIEF DESCRIPTION OF THE DRAWINGS

FIG. 8 also shows mosaics overlapped in perfect registration as they would appear to the naked eye. The pattern is now totally intelligible, and in fact it is the same pattern as in FIG. 5.

FIG. 18 shows 13 basic shapes, 4 elemental squares and the well known 12 "pentominoes", that may be created from joining 5 equal "elemental" squares edge-to-edge.

FIG. 19 shows two of the estimated 10,000 ways in which the 12 pentominoes (allowing for pieces to be turned over) plus 4 elemental squares can be arranged to cover an 8×8 array of elemental squares.

FIG. 20 shows an assortment of 14 "square" elements that can be used to form pentominoes that have a greater degree of interlocking than the elemental square variety.

FIG. 21 shows the interlocking pentomino shapes that are created using an element of FIG. 20.

FIG. 22 shows two examples, analogous to those of FIG. 19, of how interlocking pentominoes of FIG. 21 may be joined to cover an 8×8 array of elements from FIG. 20.

FIGS. 23 and 24 show how the data contained in the 64×64 square arrays of FIGS. 4 and 5 can be cut into interlocking pentomino shapes of FIG. 21.

FIG. 25 shows some of the 36 basic "heptomino" shapes that can be created from 6 elements of FIG. 20.

FIG. 26 shows an arrangement of interlocking puzzle pieces made from differing numbers of elements, ranging from one to sixteen, that cover a larger 16×16 array of elements of FIG. 20.

FIGS. 28A, 29, 30A, 30B, 31A, 31B, 32A, 32B, 33 illustrate multiplexing 2 or more images into a single light polarizing mosaic pair.

STRUCTURE AND OPERATION

This invention uses well known properties of light-polarizing materials to achieve its ends.

To illustrate the concept of modulo-two addition using polarizing material consider two small pieces, or chips, of linear polarizing sheet such as HN38S produced by the Polaroid Corporation of Norwood, MA. (Other linear or circular Polarizing material such as Polaroid HN32X or Polaroid HNCP37 may be used as well.)

Figure 1A:
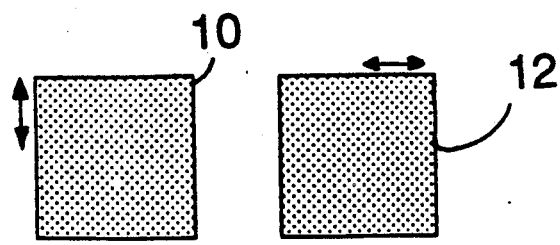
FIG. 1a, 1b and 1c illustrates some of the properties of light polarizing sheets.

This HN38S polarizing material is semi-transparent, appearing neutral gray to the eye regardless of how it is oriented with respect to unpolarized light. This effect is illustrated in FIG. 1a, which shows the appearance of two pieces of a polarizing material (10, 12) viewed against a background of unpolarized light. The arrows indicate the orientation of the axes of polarization. The HN38S material will only transmit light whose polarization lies on the polarization axis of the material. Light whose polarization is transverse to the material's polarization axis, roughly 50% of the impinging unpolarized light, will not be transmitted, which is what gives the material its semitransparent, gray appearance.

Figure 1B:
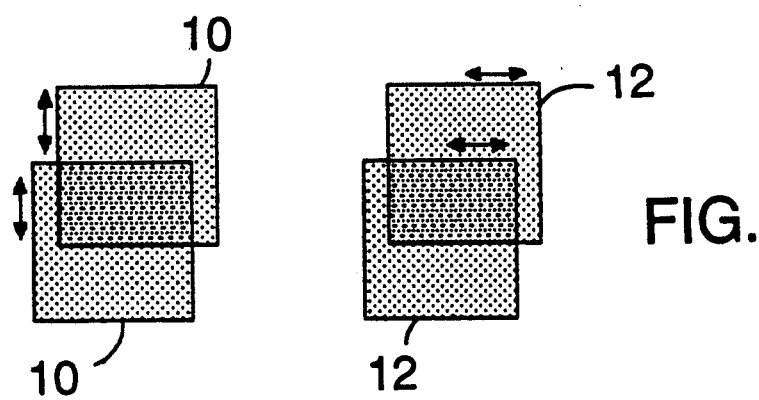

Light that has passed through a first piece of polarizing material will pass through a second piece of polarizing material only if the polarizing axes of the two pieces are parallel. The combination of two pieces of HN38S will pass roughly 30% of the impinging unpolarized light in this case. FIG. 1b illustrates the appearance of overlapped pieces having axes parallel when viewed against a background of unpolarized light.

Figure 1C:
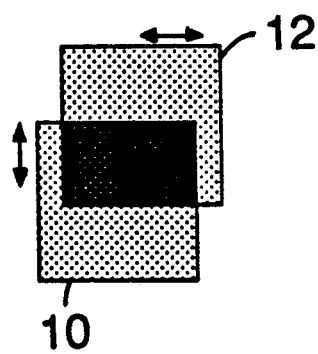

If the polarizing axes are perpendicular, the combination of two pieces will pass less than 0.1% of the impinging light, 1/300th part of the light transmitted when axes are parallel. FIG. 1c illustrates the appearance of overlapped pieces having axes perpendicular when viewed against a background of unpolarized light.

Figure 2:
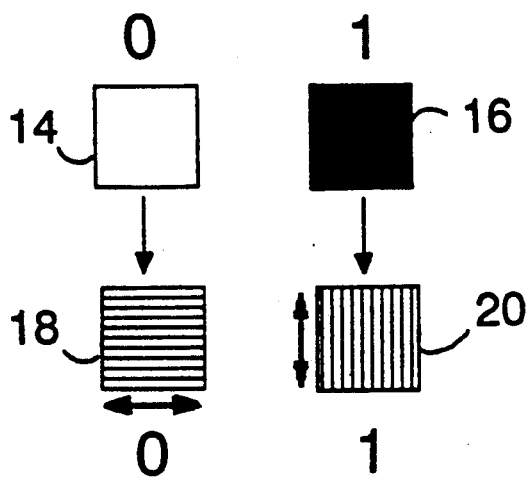
FIG. 2 shows pieces, or chips, of polarizing material with polarizing axes horizontal and vertical. This figure illustrates the association of axes of polarization with binary symbols, the association of overlaying two chips with the mathematical symbols of modulo-two addition, and the association of light transmission properties of four combinations of overlaid pairs of chips with binary symbols.
Figure 2:
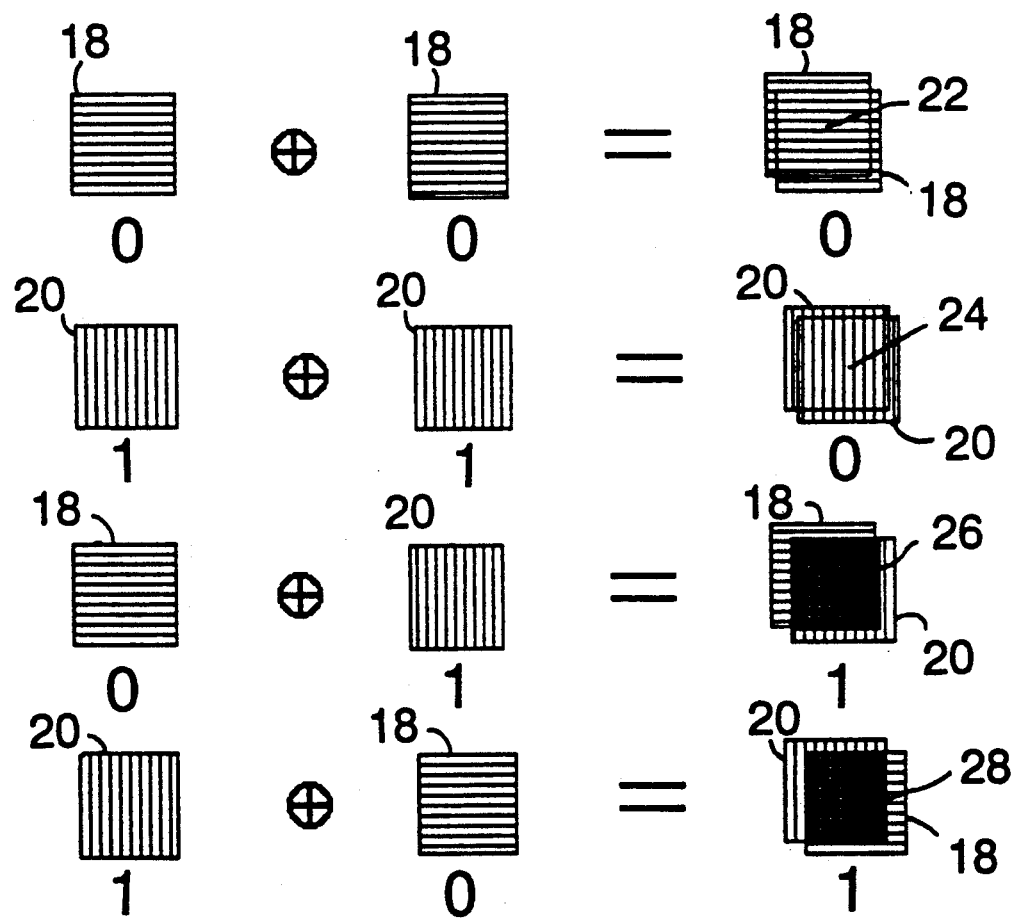

Referring to FIG. 2, a binary bit of data representing a light transmissive state "0" or a non-transmissive state "1", 14, 16 respectively, may be stored in a polaroid chip by orienting the polarization axis of the chip to one of two orthogonal polarization axes. For example, if a horizontally polarized chip 18 is chosen to represent a light transmissive "0" condition, then a vertically polarized chip 20 represents a non-transmissive "1" condition. Rather than the symbolic binary terms "0" and "1", the binary data stored in the polaroid chip could refer to "light" and "dark", as might relate to the state of a particular point in a graphic image or on a printed page of text. Also, the binary symbol "0" can be assigned to the outcome of light transmission through two chips whose axes are parallel, and "1" can be assigned to the polarizing axes are parallel, and "1" can be assigned to the outcome of light non-transmission through two chips whose axes are perpendicular.

Considering two such light-polarizing chips that overlie each other, if both chips are polarized to represent the same binary term (i.e., both are "0"'s to represent transmission, or both are "1"'s to represent non-transmission), their respective polarization axes will be parallel and the combination 22, 24 will pass light (i.e., result in a "0", or transmission of light). If the two chips are polarized to represent different binary terms (i.e., one chip is a "0" to represent transmission, and the other chip a "1" to represent non-transmission) their respective polarization axes will be perpendicular, and the combination 26, 28 will block light (i.e., result in a "1", or non-transmission of light). This behavior mimics exactly the rules for modulo-two addition of binary numbers: namely, on a bit by bit basis, $0 \oplus 0 = 0$, $0 \oplus 1 = 1$, $1 \oplus 0 = 1$, $1 \oplus 1 = 0$, and there are no carrys.

Modulo-two addition is frequently used in binary data processing. In particular, modulo-two addition has the following property that makes it useful in data encryption schemes: A binary number "N" modulo-two added to a binary number "M" results in a binary number "R"; and if binary number "M" is then modulo-two added to binary number "R" the result is again binary number "N". This is true no matter how many bits are contained in the numbers, even thousands of bits. Therefore, a string of binary data to be transmitted, such as digital information to be sent over telephone lines, may be modulo-two added to a "random key" data string and the resultant scrambled data then transmitted. If the recipient has possession of the "random key" data string he can recover the original data from the received scrambled data by modulo-two adding the received data to the "random key". This subject is described in the book *Cryptography: A New Dimension in Computer Data Security* by Carl H. Meyer and Stephen M. Matyas, John Wiley and Sons, New York, 1982.

Figure 3:
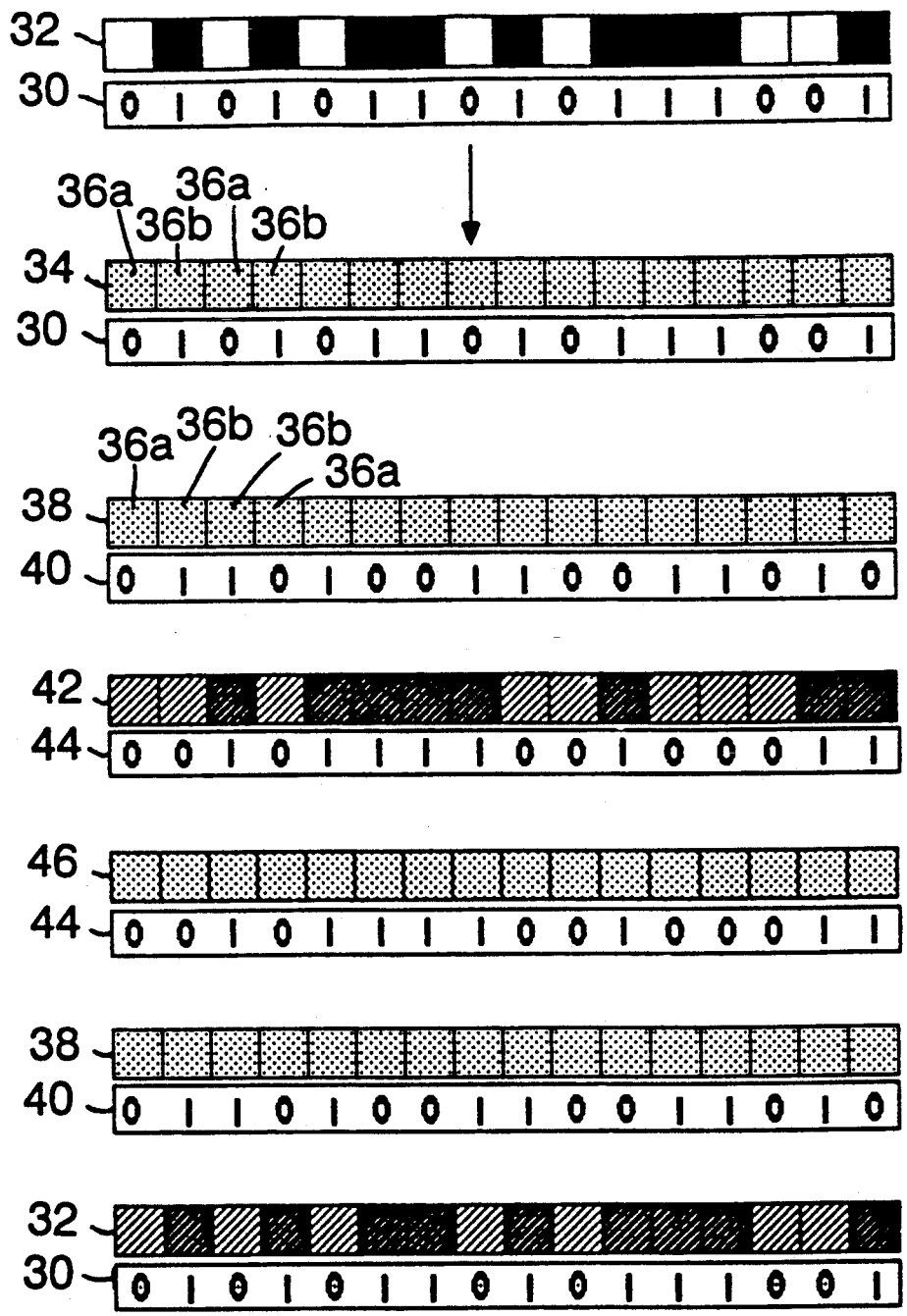
FIG. 3 shows linear mosaics each consisting of 16 light-polarizing chips, as they would appear to the naked eye against a background of unpolarized light. Shown adjacent to the mosaics are two binary numbers indicating the orientations of the axes of polarization of adjacent chips, in accordance with the associations shown in FIG. 2. Also shown is the appearance to the eye of the two mosaics when one is overlaid on the other, and the binary number associated with this pattern of light and dark cells.

Referring to FIG. 3, a string of binary data bits 30 can be visually represented in terms of light transmission by a corresponding string 32 of adjacent light (transmissive) and dark (non-transmissive) areas having binary light transmission codes of "0" and "1", respectively. In turn, string 32 can be represented in terms of light polarization by a string 34 of adjacent polarized areas 36, each of whose polarization represents the corresponding light or dark state of original string 32. Each of the polarized areas 36a, 36b, for example, may be a polarized chip oriented either horizontally 36a to represent a "0", or vertically 36b to represent a "1". A "random key" string 38, representing a "random key" binary sequence 40, is similarly encoded using polarized areas 36a, 36b. When the two polarized encoded sequences 34, 38 are aligned and overlaid, a "scrambled" sequence 42 of light and dark areas results, representing "scrambled" binary sequence 44. "Scrambled" sequence 42 is the modulo-two addition result of the original and "random key" data strings represented in binary light transmission terms.

In turn, the light transmission scrambled sequence 2 may be encoded into a polarized sequence 44. When polarized sequence 44 is aligned and overlaid with the "random key" polarized sequence 38, the original light transmissive sequence 32 results. Thus, two apparently randomly polarized sequences ("random key" and "scrambled"), when properly aligned and overlaid, produce the original desired sequence of light and dark areas. These properties also apply to two-dimensional binary arrays representing images, as discussed below.

Figure 4A:
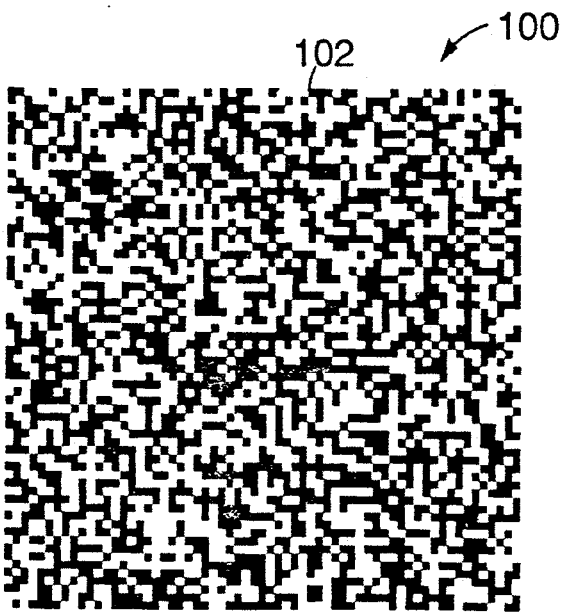
FIGS. 4a, 4b and 4c shows 4096 bits of binary data arranged in a rectangular array of 64×64 bits which forms a random pattern that conveys no apparent meaning to the eye. A mosaic of light-polarizing chips containing this random binary data is shown as it would appear to the naked eye, and also as it would appear to the eye through polarizing material.

Referring to FIG. 4a, a visible binary image 100 is a two-dimensional image in which there are only two levels of light differentiation, and refers, for example, to black and white or monochrome images such as a page of printed text, line drawings, woodcuts, lithographs, halftone printed images, and also the image on a monochrome computer visual display.

For purposes of image manipulation and storage in a computer environment a binary image may be subdivided into numerous small, regular picture elements (pixels), the number of pixels being greater the greater the image resolution desired. Typical pixel resolution for printed text and graphic images range from 50 pixels per inch on a computer screen to 2500 pixels per inch on a high quality computer screen or a high quality computer printer. Dividing the image into pixels makes it possible to store, manipulate and transmit images symbolically using computers because each pixel can be assigned as either black or white ("1" or "0"), and hence the entire image can be reduced to an array of binary numbers. Handling images in this manner is commonplace in the practice of digital computation.

Figure 4B:
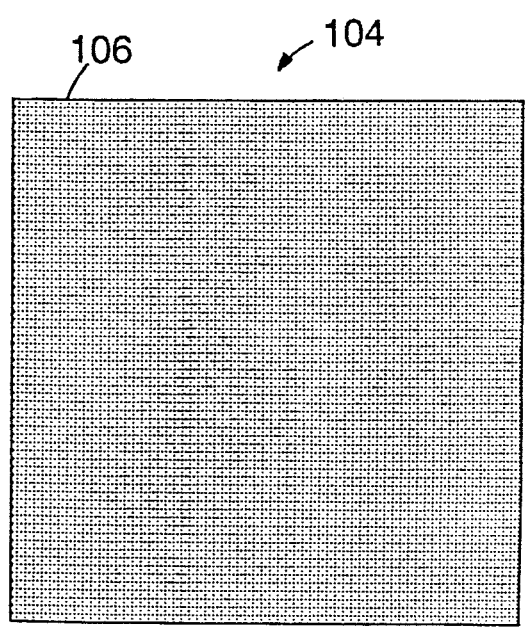

Referring also to FIG. 4b, the binary image 100 of FIG. 4a is reduced to pixels 102 and then stored on a pixel by pixel basis as a planar light-polarizing mosaic 104 of small elements 106 (chips) of light-polarizing material. The light-polarizing mosaic 104 is a plane sheet containing many chips or cells 106 of polarizing material, usually one chip per pixel, wherein each chip or cell may have either of two mutually perpendicular light polarizing orientations. The resulting mosaic 104 of FIG. 4b will have a uniform, essentially transparent appearance under unpolarized light and will not exhibit the binary light and dark features manifest in the original image of FIG. 4a. In effect, the original image will be invisible when stored in the polarizing mosaic form.

Figure 4C:
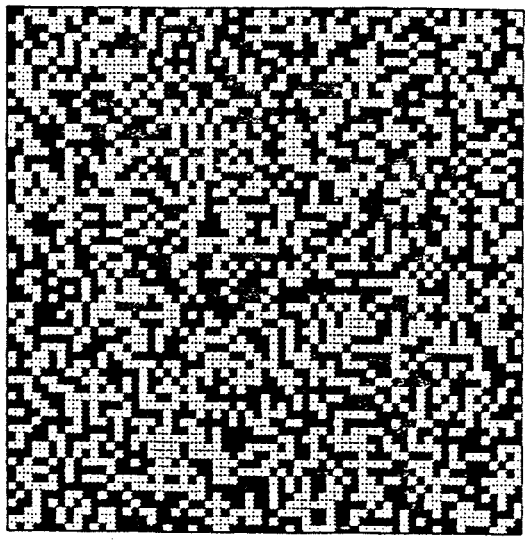

Referring to FIG. 4c, if the mosaic of FIG. 4b is viewed in polarized light, polarized parallel to the stored polarized state representing a "0" and orthogonal to the stored polarized state representing a "1", the stored image becomes immediately visible, since the polarized states of the mosaic pixels correspond to the light and dark states of the pixels in the original image. This occurs because the stored polarized state representing a "1" (dark) blocks the transmission of the orthogonally polarized viewing light, and, the stored polarized state representing a "0" (light) transmits the parallel polarized viewing light. If the orientation of the polarized light were rotated perpendicular to the original orientation, the image would then appear to be a negative of the original.

The modulo-two addition property of linear binary polarized sequences, discussed above with reference to FIGS. 2 and 3, can be extended to two-dimensional images represented by light-polarized mosaics (i.e., binary polarized arrays) to, for example, create a "scrambled image" from an original image and a "random key image", or recreate an original image from a "random key image" and a "scrambled image". Two mosaics, each containing many polaroid chips oriented to represent binary data such as a "random key image" and a "scrambled image", can be modulo-two added in entirety by properly aligning and overlaying them. The resulting modulo-two sum becomes visible to the naked eye as a result of overlaying. Meaningful results from the overlay process will be obtained provided the two mosaics are exactly registered (i.e., corresponding pixels in the two mosaics lie fully on top of one another). Without proper alignment the overlay process will most likely result in unintelligible patterns of light and dark spots. However, it is part of the appeal and usefulness of the present invention that misregistration does in fact result in unintelligible patterns, as discussed below.

Figure 5:
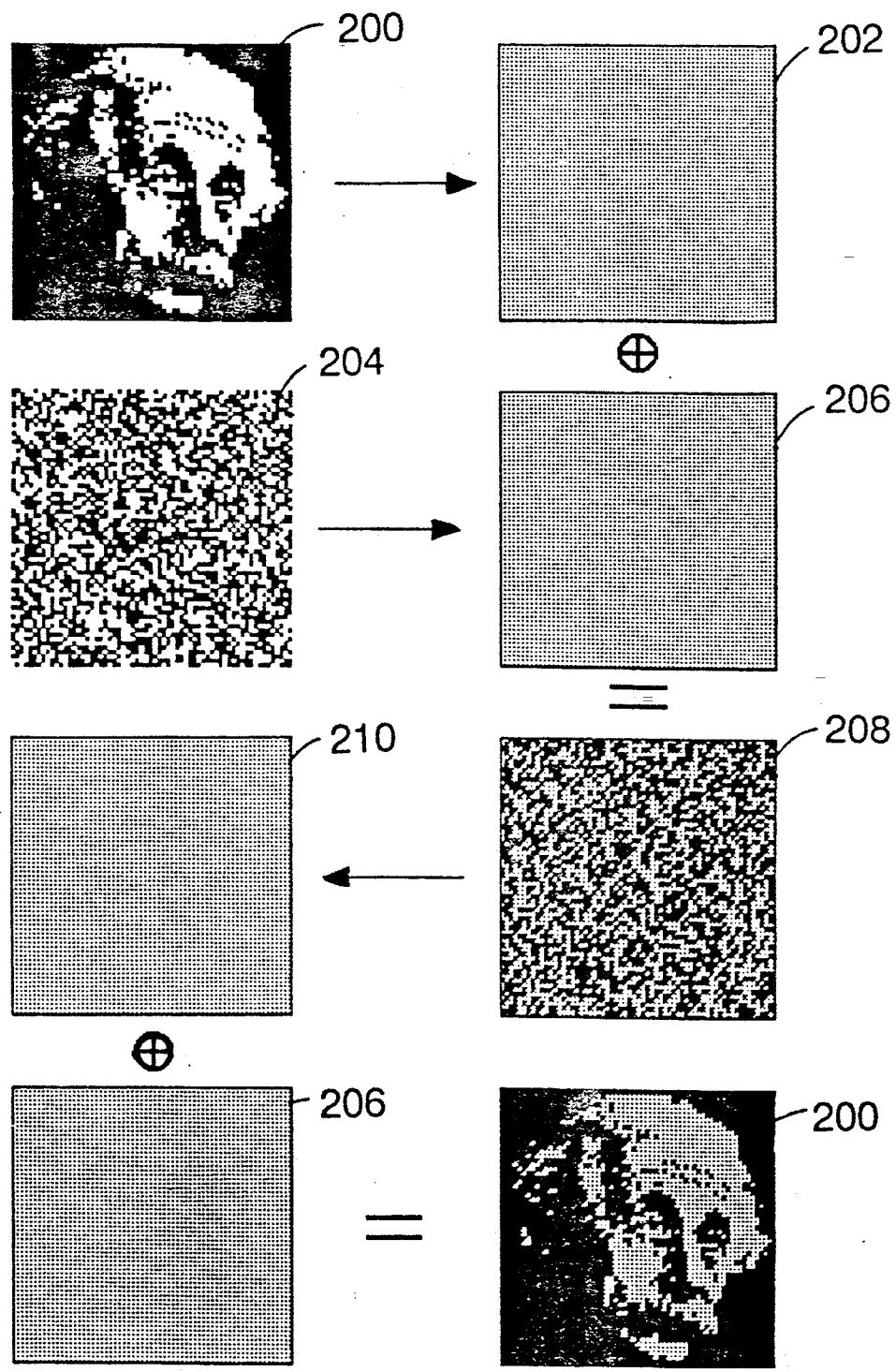
FIG. 5 shows the same rectangular array of binary data, shows another 64×64 cell rectangular array of binary data with an intelligible pattern, and shows a third 64×64 cell rectangular array of binary data which is the modulo two sum of the data arrays.

Referring to FIG. 5, a binary image 200 appears as light and dark pixels and may be represented by a 64×64 pixel light-polarizing mosaic 202, which when viewed with polarized light, exactly resembles binary image 200. Similarly, a random binary image 204 of light and dark pixels may also be represented by a 64×64 pixel light-polarizing mosaic 206, which appears as the same random pattern 204 of light and dark pixels when viewed with polarized light. A scrambled binary image 208 having a random pattern of light and dark pixels (when viewed in unpolarized light) is produced by aligning and overlaying image mosaic 202 and random mosaic 206. Scrambled binary image 208 may itself be represented by a 64×64 pixel light-polarizing mosaic 210, which appears as the same scrambled image 208 when viewed with polarized light. The original binary image 200 is reproduced from the scrambled image light-polarizing mosaic 210 and the random light-polarizing mosaic 206 by aligning and overlaying the two light-polarized mosaics. Original image 200 then appears as light and dark pixels when viewed with unpolarized light. Thus two light polarizing mosaics 206, 210, each appearing transparent under unpolarized light and random under polarized light, produce an intelligible binary image, viewable in unpolarized light, when properly aligned and overlaid.

Random image 204, having 4096 pixels, may be created by a shuffling process such as by shaking 2048 black and 2048 white marbles in a bag and then blindfoldedly drawing them out of the bag and placing them on a 64×64 grid. The resulting pattern is then reproduced in a polarizing mosaic by one of the methods described below.

The same 64×64 random pattern may be copied into a computer, which also contains a second 64×64 pixel image of a more traditional sort, one that is easily recognized or that conveys intelligible information, for example, image 200 of FIG. 5. In the world of personal computers there are numerous programs that can be used to modulo-two add two images pixel by pixel and to display the result, which in the example would appear as in 208 FIG. 5. (The computer software used to create the examples in FIG. 5, is called *Videoworks II* by Macromind Inc. of Chicago.) Image 208 is then used as the pattern for making the second polarizing mosaic 210, call it the "composite mosaic", by one of the below three methods (not necessarily the same one used to create the random mosaic). The composite mosaic is illustrated at 211 in FIG. 6, and in polarized light it would appear as in 213 FIG. 6. (211 and 213 are enlargements of 208 and 210 respectively.)

In this example the pixels in the two mosaics are identical in size and shape, and the two mosaics are to be overlaid in contact. Therefore, all the pixels in both mosaics will accurately line up with one another.

Figure 6:
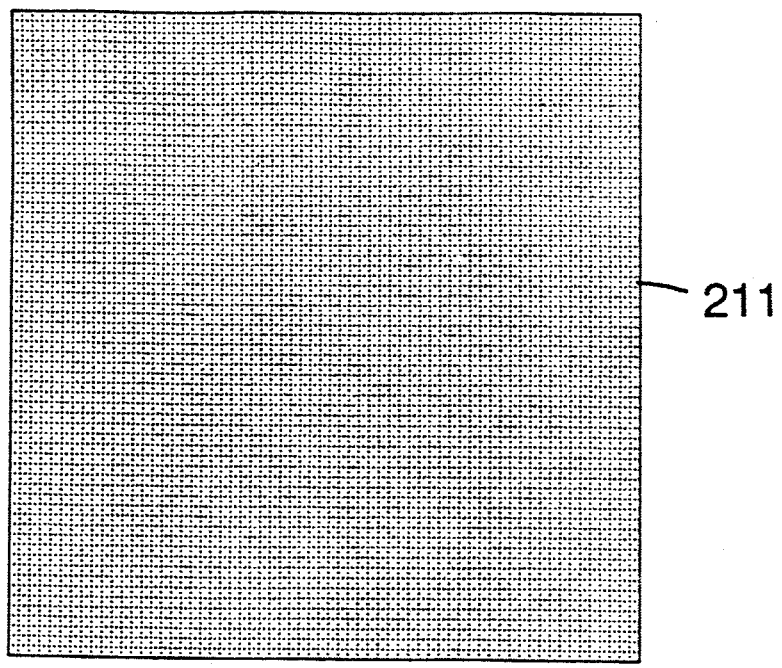
FIG. 6 shows a light-polarizing mosaic containing the binary information of FIG. 5 as it would appear to the naked eye, and as it would appear to the eye through polarizing material.
Figure 6:
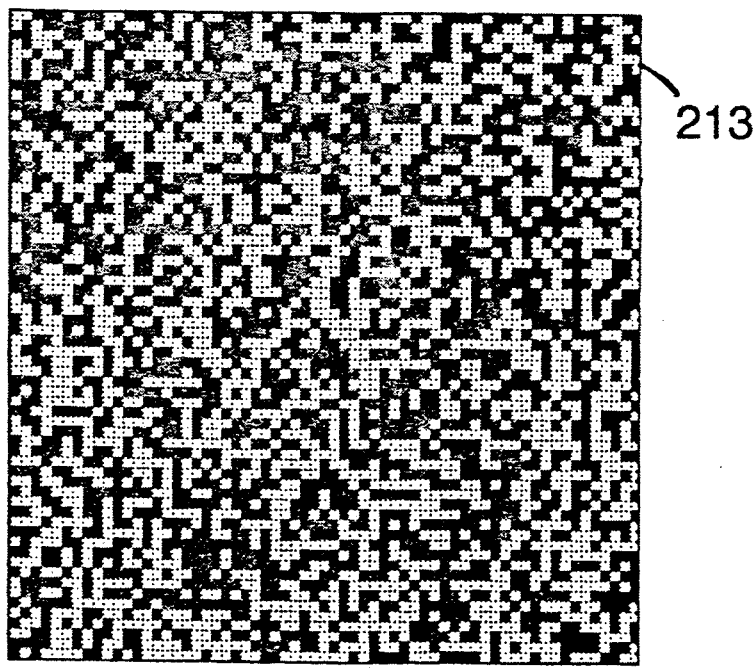
Figure 7:
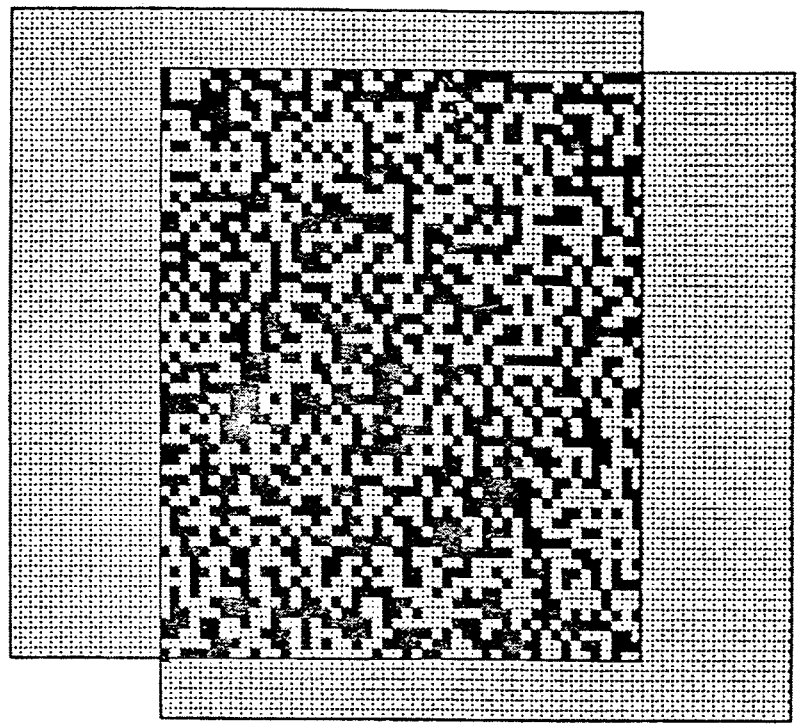
FIG. 7 shows the light-polarizing mosaics as they would appear to the naked eye when in contact and partially overlapped.

FIG. 4b shows how the random mosaic appears in unpolarized light, and 211 of FIG. 6 shows how the composite mosaic appears in unpolarized light. Notice that there are no visible image features in either mosaic. FIG. 7 shows the appearance of the two mosaics when they are partially overlaid. Notice the appearance of light and dark pixels in the region of overlap only; they appear unintelligible.

Figure 8:
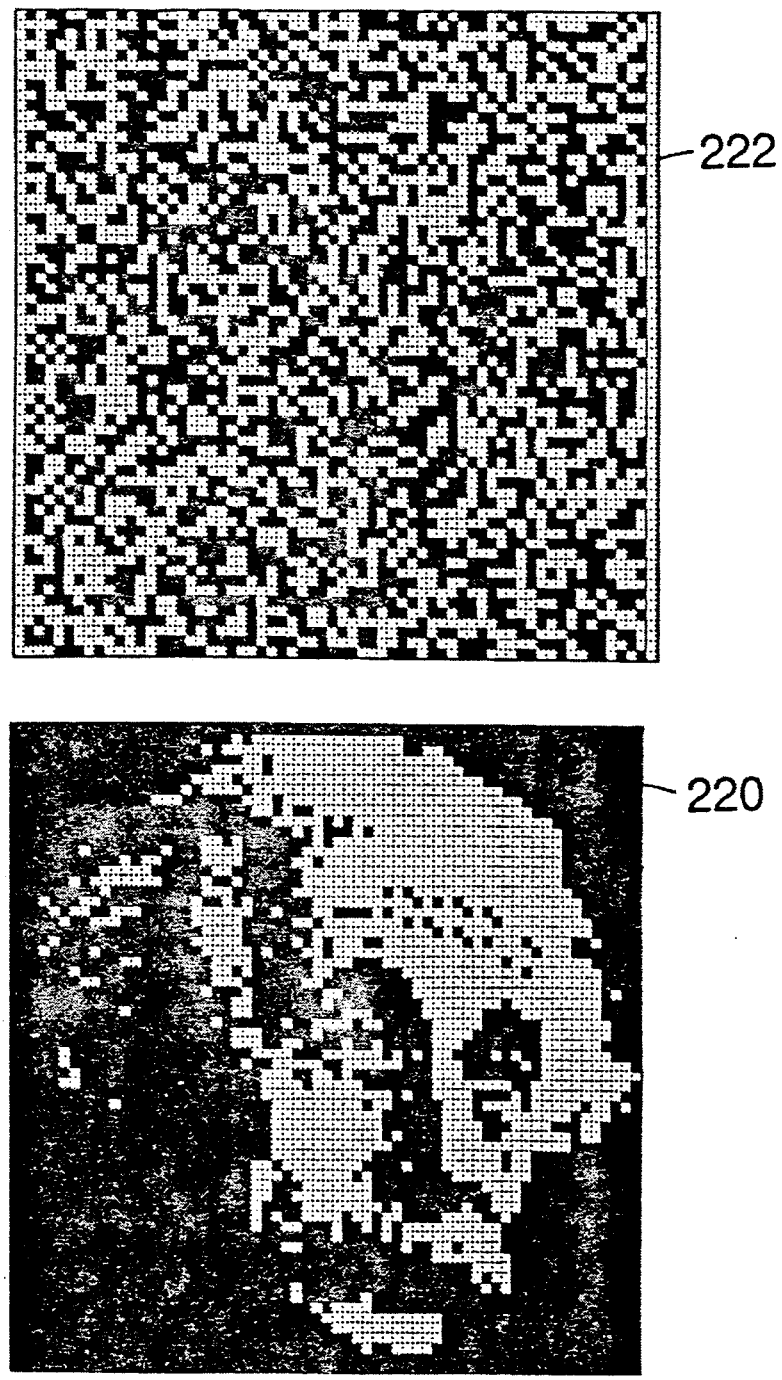
FIG. 8 shows the light-polarizing mosaics as they would appear to the naked eye when overlapped and in almost perfect registration except for one column of pixels. The pattern exhibited is totally unintelligible to the eye, and more exhibits no hint of an intelligible image to come when the area of overlap is increased by the one column of pixels.

Image 220 of FIG. 8 shows the situation where the two mosaics are fully overlaid and registered. Note the reappearance of the image of 200 FIG. 5, which is the result of two successive modulo-two additions to image 200 of FIG. 5 (the intelligible image) of image of FIG. 4a (the random image).

Image 222 of FIG. 8 shows the situation wherein the two mosaics are misaligned by but a single row of pixels. Notice that there is no suggestion of image 200 of FIG. 5 in the resultant visible image appearing in the overlap area 222 of FIG. 8, which appears as unintelligible as ever. This is a consequence of the random nature of the image of FIG. 4a. Because image 200 of FIG. 5 appears suddenly as the registration point is reached, not gradually as the registration point is approached, there is an element of complete surprise that enhances the utility of the present invention.

The invention can be applied in a variety of ways. The process of creating the two mosaics can be done directly and simply from pixels of an image by a computer. Each pixel value is modulo-two summed with a random bit. The resulting set of pixel values specify how the scrambled mosaic is to be assembled. And the original matrix of random bits specifies how the random key 5 mosaic is to be assembled. Thus, in FIG. 5, steps 202 and 208 can be circumvented.

For an example of an application of two light-polarizing mosaics in contact overlay, consider two polarizing mosaics formed into a two-page greeting card where one mosaic is free to slide back and forth with respect to the other. A hidden message will be suddenly revealed when the point of registration is reached.

Figure 10:
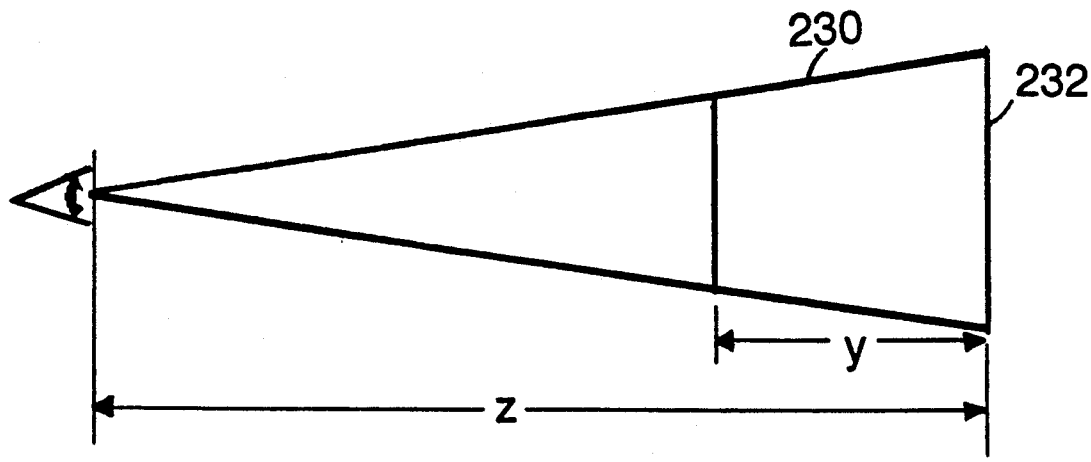
FIG. 10 shows the geometry of a pair of light-polarizing mosaics where, instead of being in contact, the mosaics are mounted parallel but separated by a distance y, and the viewer's eye is located at a distance z, which requires the intermediate mosaic to have a smaller scale by the ratio $z/(z-y)$ in order for the two mosaics to appear to the eye to be in register over the entire field. Because the two mosaics are separated, changes in viewer position will affect the registration of the mosaics and thereby cause a change in the appearance of the overlapped mosaics.

To illustrate a configuration of a light-polarizing mosaic pair having appealing visual properties, consider an arrangement as in FIG. 10, where the two mosaics 230, 232 each having uniformly sized square cells are placed parallel but separated by a distance y; where the viewer is at a distance z; and where the ratio of the pixel (cell) size of the farther mosaic to the nearer mosaic is $z/(z-y)$, so that all the cells may be seen in registration. Let $z/(z-y)=1.25$ by way of example; therefore, $z=5y$.

Figure 11:
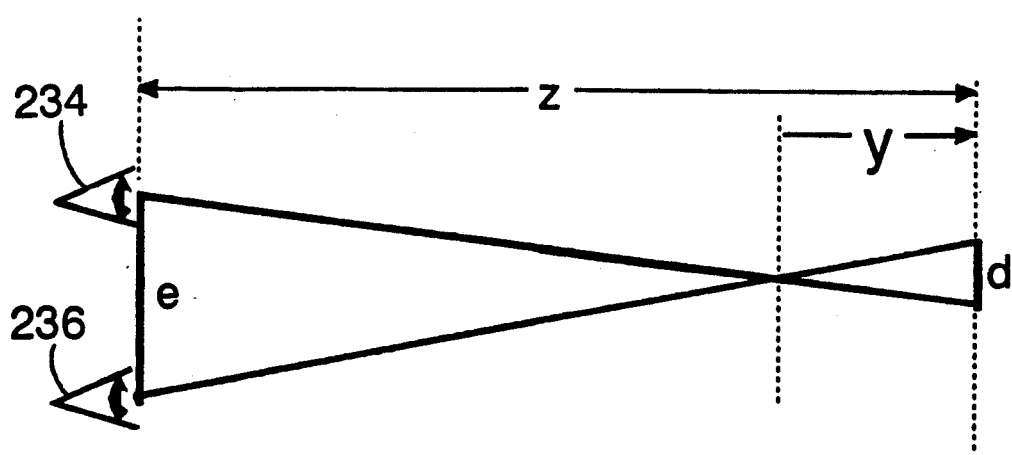
FIG. 11 shows the geometry associated with a pair of mosaics and lateral movement of the viewpoint.

Let the pixel (cell) size $p_f$ of the farther mosaic be such that at the distance z, the viewer perceives the pixel as having angular extent equal to 1/500 radians, or $p_f=z/500$. From FIG. 11 it is apparent that a displacement of the viewpoint from 234 to 236 by a distance e in a direction parallel to the plane of the parallel mosaics will cause an apparent parallel displacement of the farther mosaic with respect to the nearer by a distance $d=e\,y/(z-y)=e/4$. Let the displacement e of the viewer's viewpoint be 64 mm, which is the approximate distance between a person's left and right eyes; therefore, $d=e/4=16$ mm. If the resultant apparent relative displacement of the two mosaics be exactly one pixel, $p=d=16$ mm, and therefore, $z=500$ $p=8000$ mm; y $=z/5=1600$ mm; and the pixel size of the nearer mosaic $=16/1.25=12.8$ mm.

Given a mosaic pair configured to have the dimensions derived above, a viewer passing by at the distance of 8000 mm will see the mosaics shift by one pixel for every 65 mm advance of his viewpoint. At the point where the two mosaics are in registration and presenting an intelligible image, one of the viewer's eyes will see the image while the other eye will see only random spots.

For example, an artwork can be created out of two separated mosaics wherein a random pattern of black and white pixels changes in a pleasing way every time the viewer moves 65 millimeters or more. Or an artwork can be created that shows one scene to a viewer at one viewpoint and another totally different scene to a viewer at another viewpoint.

For an example of a directed signal, consider a traffic-signal that has two spaced polarizing mosaics. To the viewer at the point of registration, say in a certain lane of the roadway, the signal could appear to him as a red sign reading "Right turn OK" while to all other viewers the signal would appear as solid red. In a point-of-sale display situation, a directed message or image could flash from a display board as the viewer passes a certain spot, thus calling attention to an item for sale located at that spot.

Another example of a directed signal or directed message application of the light-polarizing mosaic pair is in flashing a brief message to a viewer in continuous motion with respect to the mosaics, such as would be the case of a viewer in a moving vehicle looking at a sign on the roadside.

For an example of a matching card game or lottery application, imagine that a large number of polarizing mosaic cards have been distributed amongst a large population. The cards contain only unintelligible random patterns which even when viewed through a polaroid chip reveal no information to the holder. Any two cards may be instantly compared, which can have one or two possible results—either more random pattern or else a coherent pattern describing the benefits accruing to the two card holders when jointly presented to the game's manager.

A similar application is for official introductions. Two persons, each carry a light-polarizing mosaic card containing unintelligible "credentials", which when put together reveal an un-anticipatable message acceptable to both as legitimizing the meeting.

Figure 16:
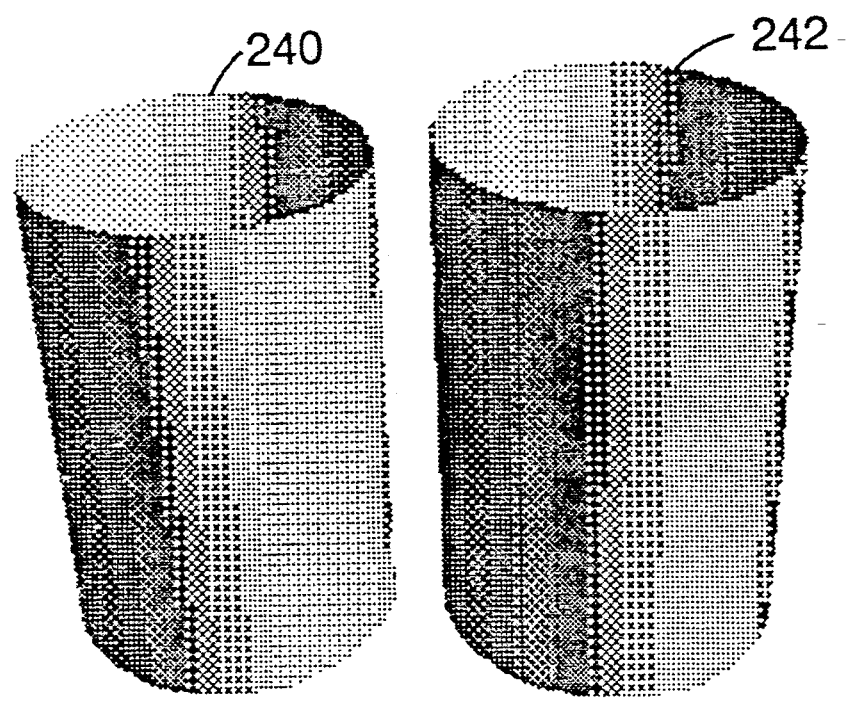
FIG. 16 shows two light-polarizing mosaic sheets wrapped into cylindrical shapes, one slightly smaller in diameter than the other.
Figure 17:
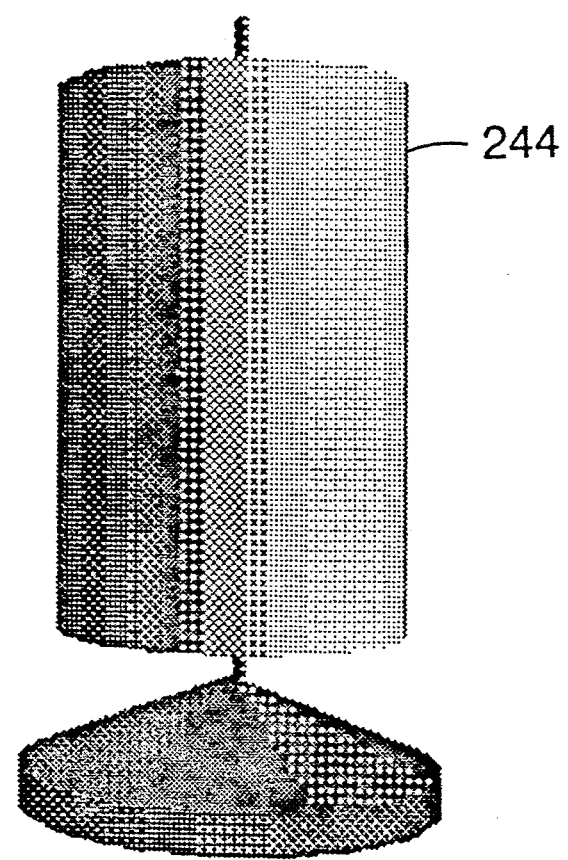
FIG. 17 shows the cylinders of FIG. 16, one inside the other and illuminated from within by unpolarized light, revealing the modulo-two sums of the individual cells as light/dark regions. In the embodiment, the inner cylinder rotates with respect to the outer cylinder, showing a variable but random pattern at all angles of alignment except one where a coherent image is suddenly revealed.

An eye-catching point-of-sale display can be created using a light-polarizing mosaic pair arranged as two closely fitting, concentric cylinders 240, 242 (not shown as concentric), FIG. 16, one of which is free to rotate about the other and may be rotated by a motor or rising hot air, such as is done in certain novelty lamps having rotating lampshades. The mosaic pair 244 (FIG. 17) is illuminated from within. As one mosaic rotates, a random image appears to cover the cylinder, FIG. 17. At a particular angle of rotation a coherent image (not shown) will briefly appear.

A light-polarizing mosaic pair may be cut into numerous smaller pieces in the fashion of a jigsaw puzzle. Since even small parts of the imbedded image are not visible unless at least two of the pieces are correctly overlapped, the shapes of the pieces remain the principal clues for reassembly of the puzzle. A particularly difficult puzzle can be created using the light-polarizing mosaic pair to remove image clues, and using particular geometric shapes to remove shape clues.

One such particularly difficult puzzle would result from cutting a light-polarizing mosaic pair (LPMP) into equal-sized square pieces. For example: take the LPMP of FIG. 5, which are considered here to have $64\times64$ cells. If each mosaic is cut into 64 square pieces, each piece having $8\times8$ cells, the puzzle consists of reassembling 128 identical looking pieces. There are (128!) ways to arrange 128 pieces; actually there are many more permutations to this puzzle given that each piece can have any of four orientations. The only practical way to solve this form of puzzle would be to piece-by-piece match up the squares in pairs by looking for recognizable imagery fragments and then assembling the square-pairs on the basis of imagery alone.

In all of the examples given so far, the cells of the mosaics have been square shaped, and the mosaics themselves have been square shaped. Although convenient, squareness is not a requirement; however, squareness can be important to the LPMP puzzle in that it permits a greater variety of ways that pieces might go together, which adds to the puzzle's difficulty. The simple square shape in the above example allows almost infinite variations, but its chief deficiency is that the pieces do not interlock, which would probably lessen the puzzle's appeal.

What is wanted for LPMP puzzles is a shape for the puzzle piece that interlocks with other puzzle pieces, a shape that has a universal quality in that it will mate with any other puzzle piece, and a shape that also has "squareness," which will allow pieces to mate along any of four faces. Additionally, the edges of the pieces should conform to the edges of the mosaic cells, and lastly, the pieces should have the ability to completely "tile the plane."

Figure 20:
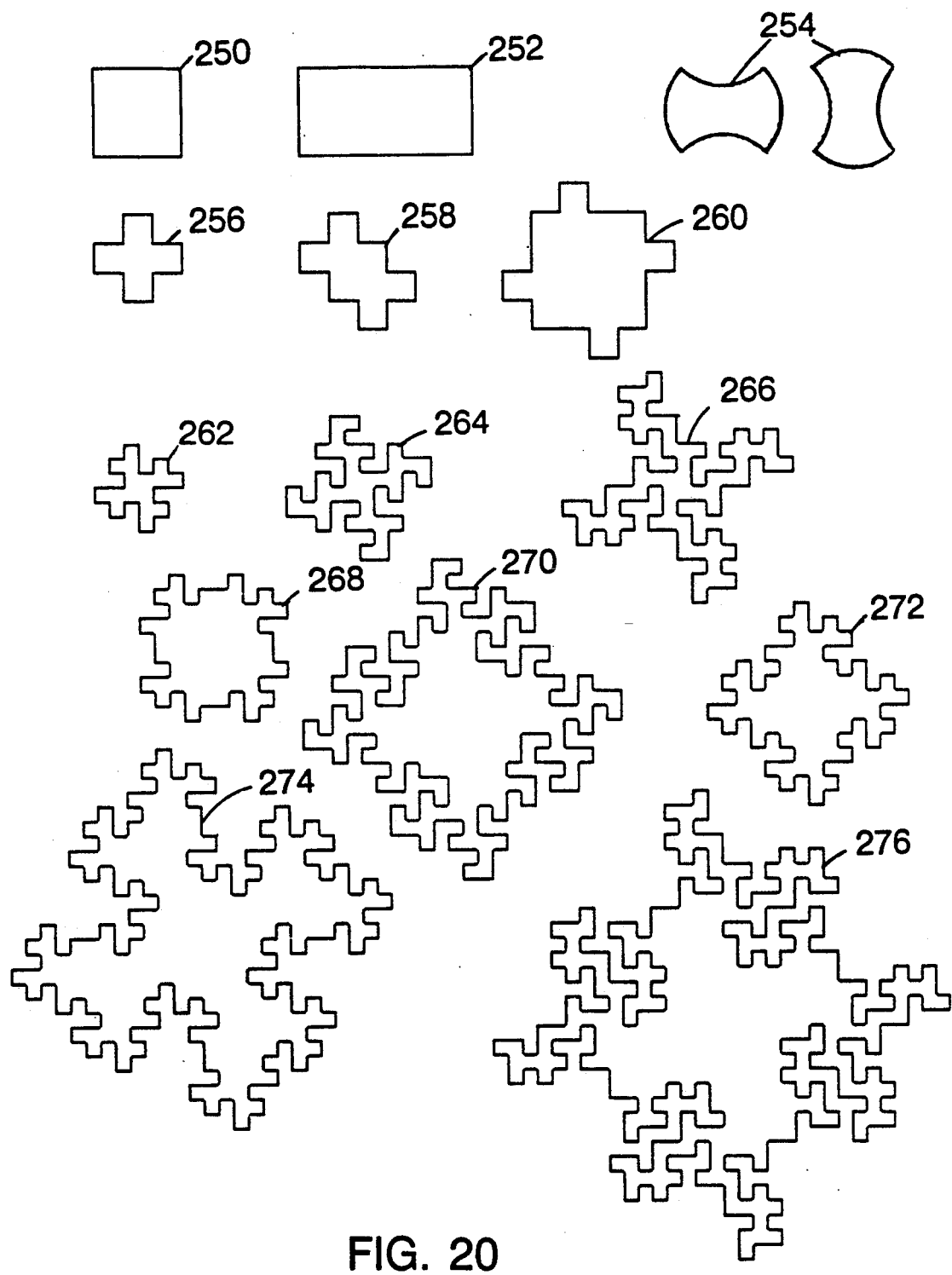

FIG. 20 shows several shapes for puzzle pieces that meet the above conditions. Shapes 250, 252, 254, 256, 258, 260, are elemental pieces. Shapes 268, 272, and 274 are composites of 262; shape 270 is a composite of 264; and shape 276 is a composite of 266. Shape 254 has all the requisite features except that its sides are curvilinear, which prohibits the piece edges from conforming to the edges of the mosaic cells. Shapes 262, 264, and 266 are adapted from fractal patterns described by Benoit Mandlebrodt. LPMP puzzles could be made from any one of the elemental pieces of FIG. 20.

Figure 18:
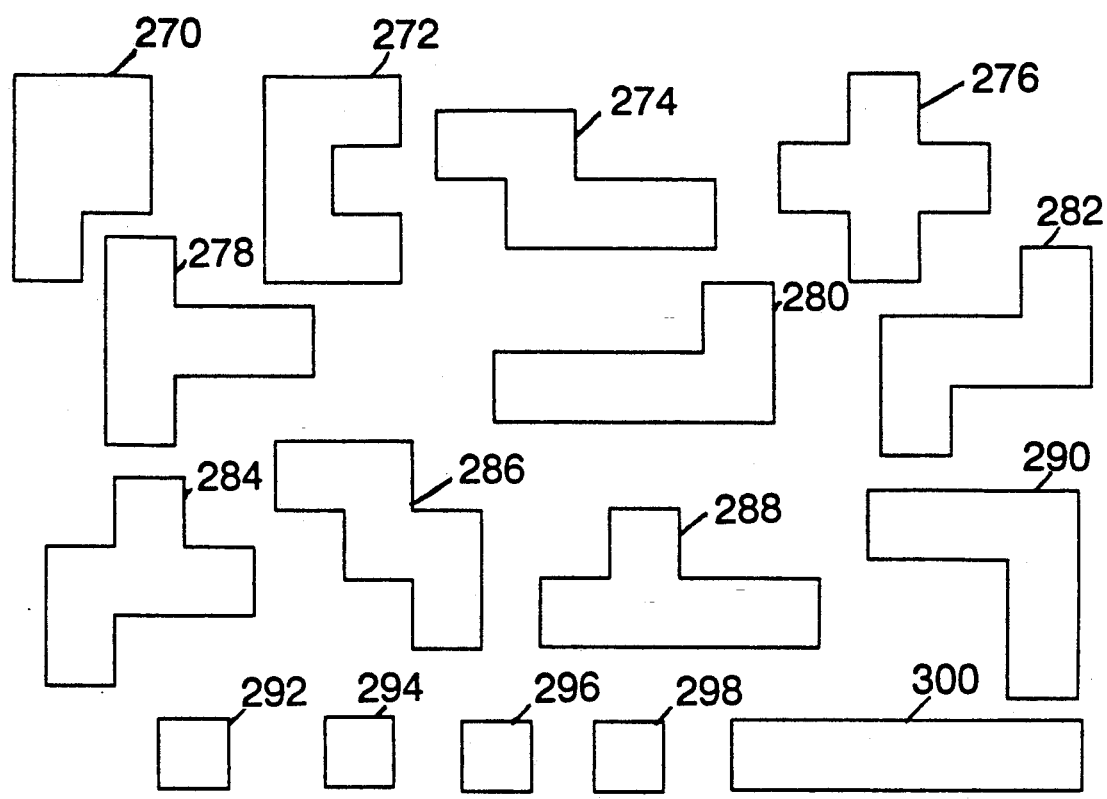
FIGS. 18 to 26 relate to the bi-level "jigsaw puzzle" application of light-polarizing mosaic pairs.

Referring to FIG. 18, shapes 270 through 290 and 300 are a set of 12 composite puzzle pieces made from the simple square elemental piece 250 of FIG. 20. Each of the 12 pieces is made from exactly 5 elemental squares, hence the name "Pentomino." The properties of pentominoes have been described in many places, notably in books and articles by Martin Gardner. The 12 pieces of FIG. 18 represent all the basic ways in which 5 elemental squares can be contiguously placed on a checkerboard grid.

A well known feature of pentominoes is that an 8×8 checkerboard can be completely covered by the set of 12 pentominoes plus 4 elemental squares 292–298. Martin Gardner reports there are perhaps 10,000 different ways the pentominoes can be placed so on the checkerboard, allowing pieces to be turned over. Two examples are shown in FIG.

Figure 19:
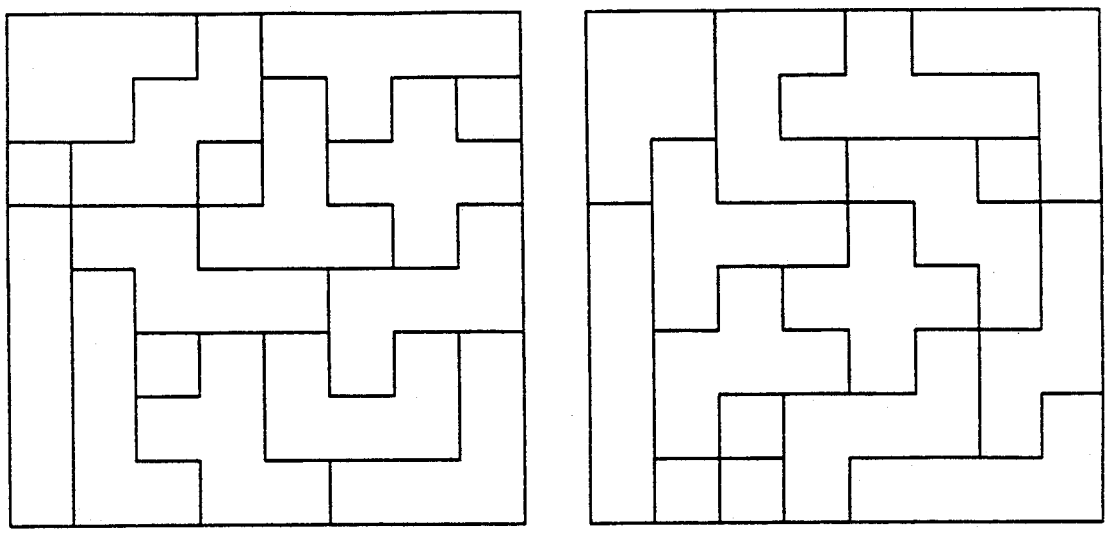
Figure 21:
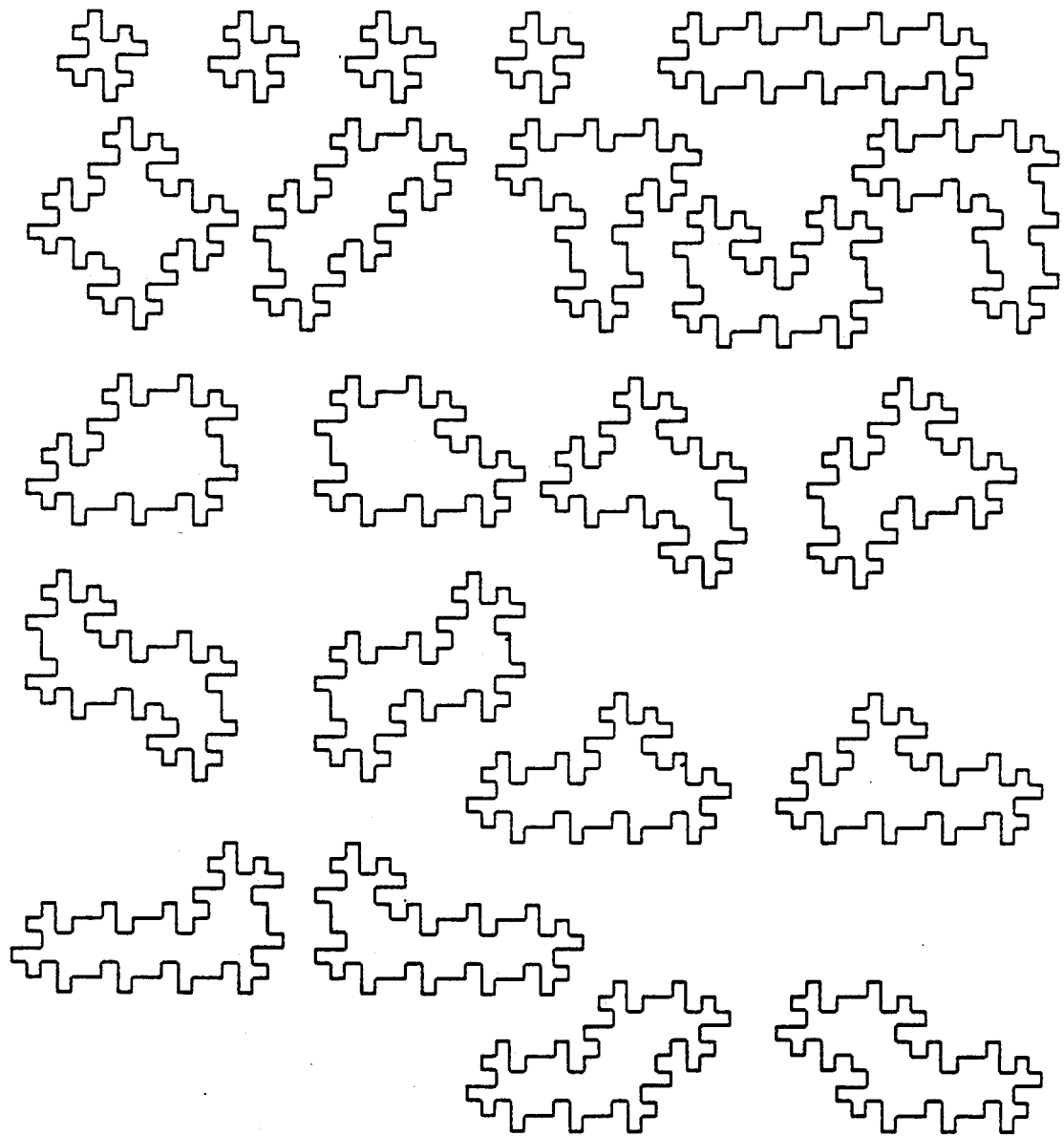
Figure 22:
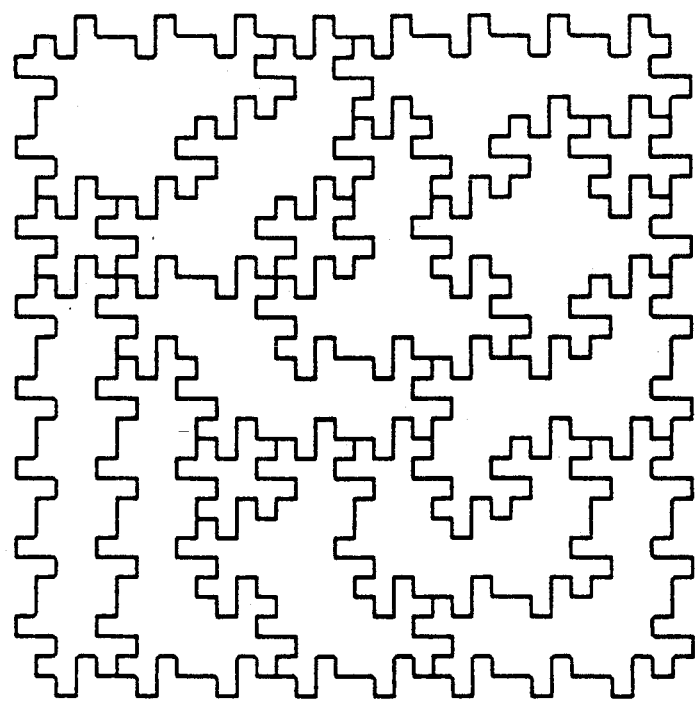
Figure 22:
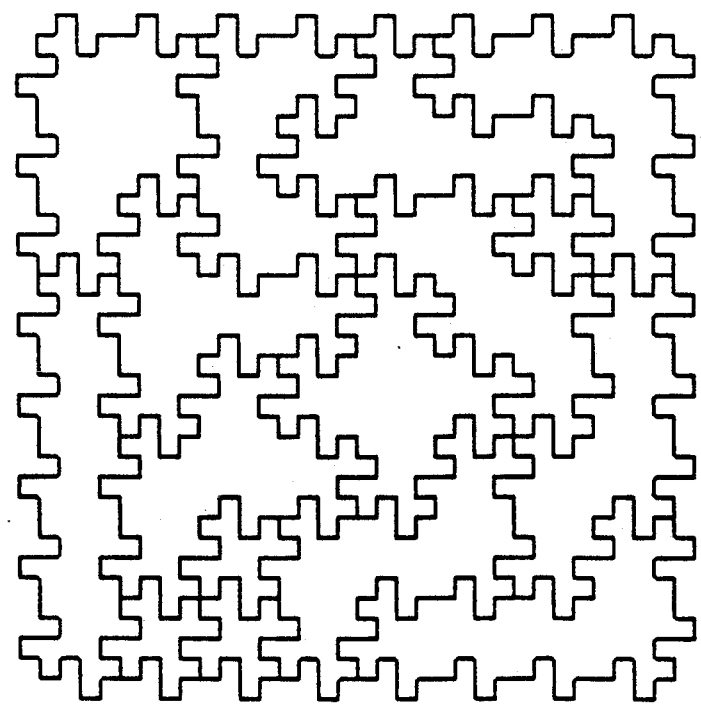

FIG. 21 shows a set of 18 pentominoes created from the elemental shape 262 of FIG. 20. Because the interlocking edge pattern is not mirror-symmetrical, the pieces will not mate if turned over; therefore, 6 additional pieces are required for completeness, which will allow as many solutions as with the square pentominoes (10,000). However, only 12 pentominoes plus 4 squares are needed to cover the checkerboard. Two examples are shown in FIG. 22, analogous to the two examples of FIG. 19.

Figure 23:
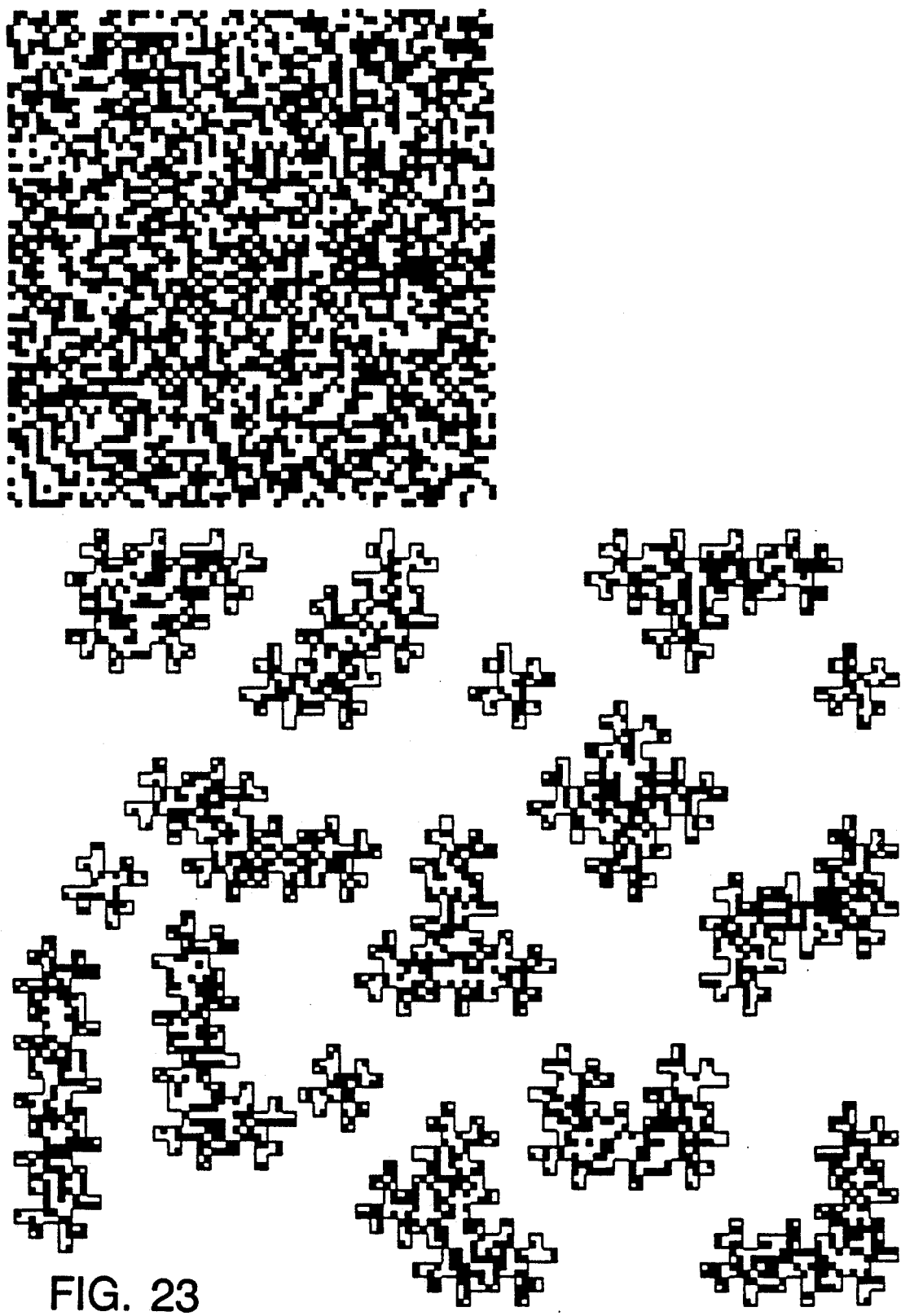
Figure 24:
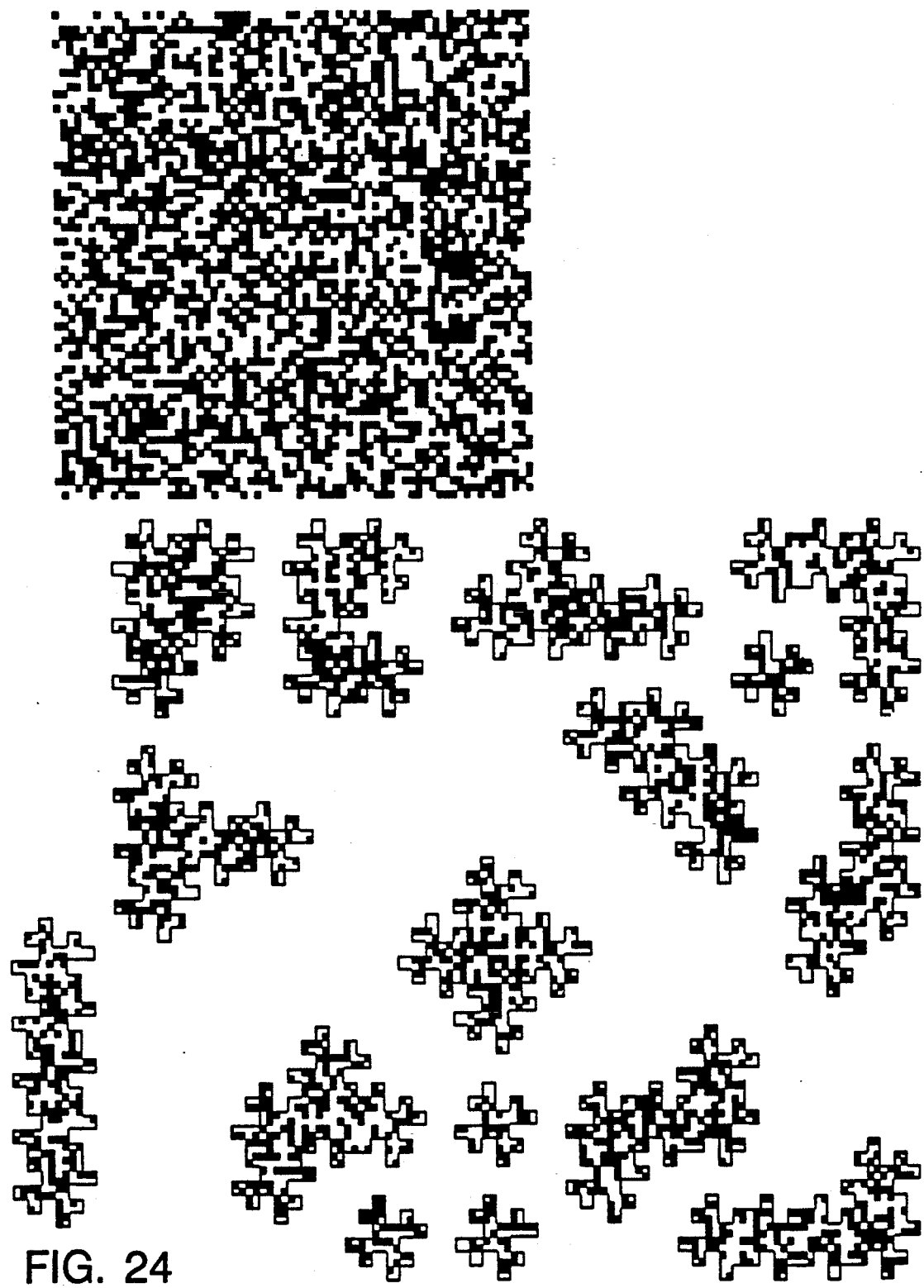

FIGS. 23 and 24 show how two mosaics of a LPMP puzzle might appear when viewed through a polarizing filter. The disassembled pieces are also shown. The pieces are arranged as suggested in FIG. 22.

Figure 25:
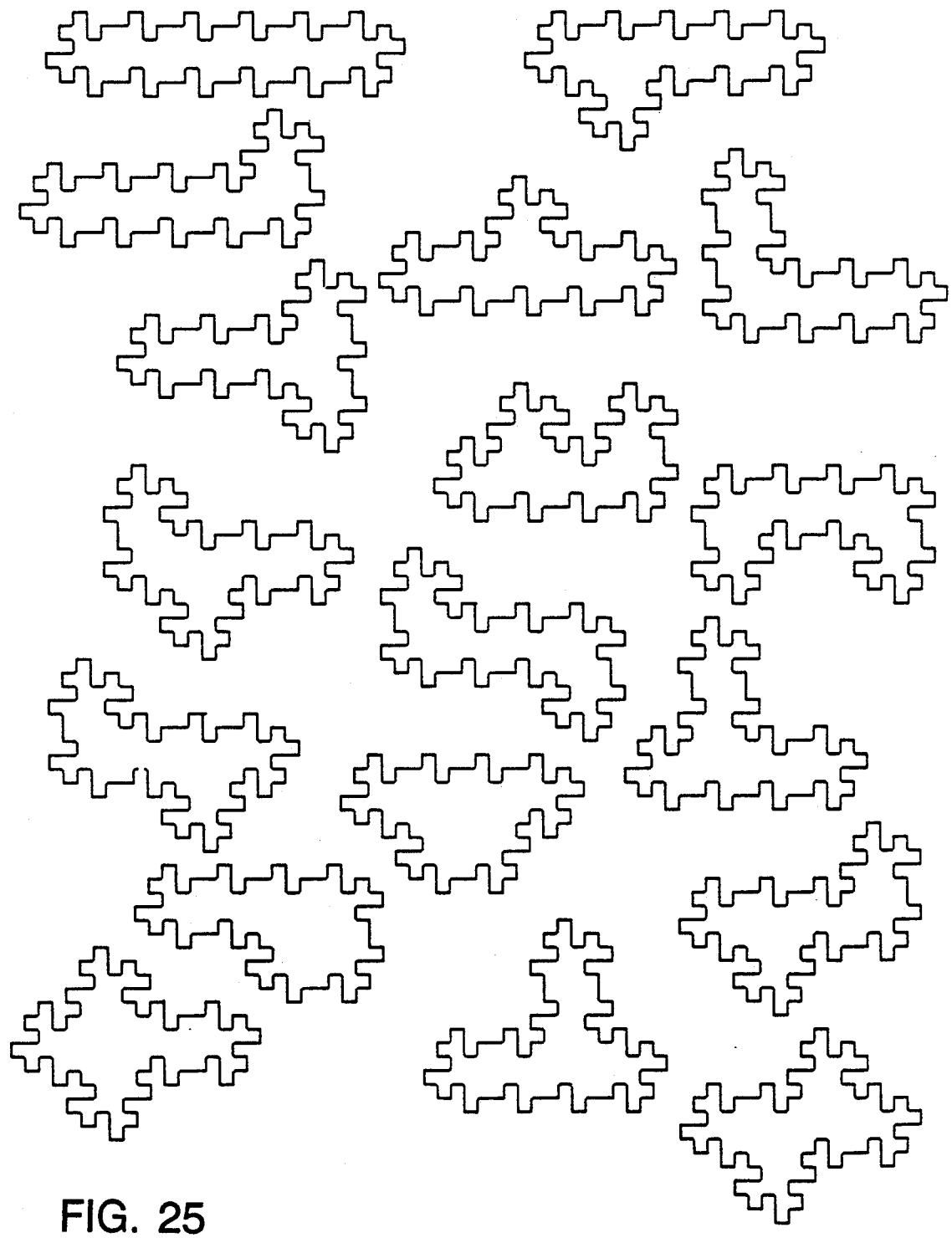

Other possible puzzle pieces are shown in FIG. 25, which shows some of the shapes that can be made using exactly six elemental shapes of type 262 (FIG. 20) ("heptominoes").

Figure 26:
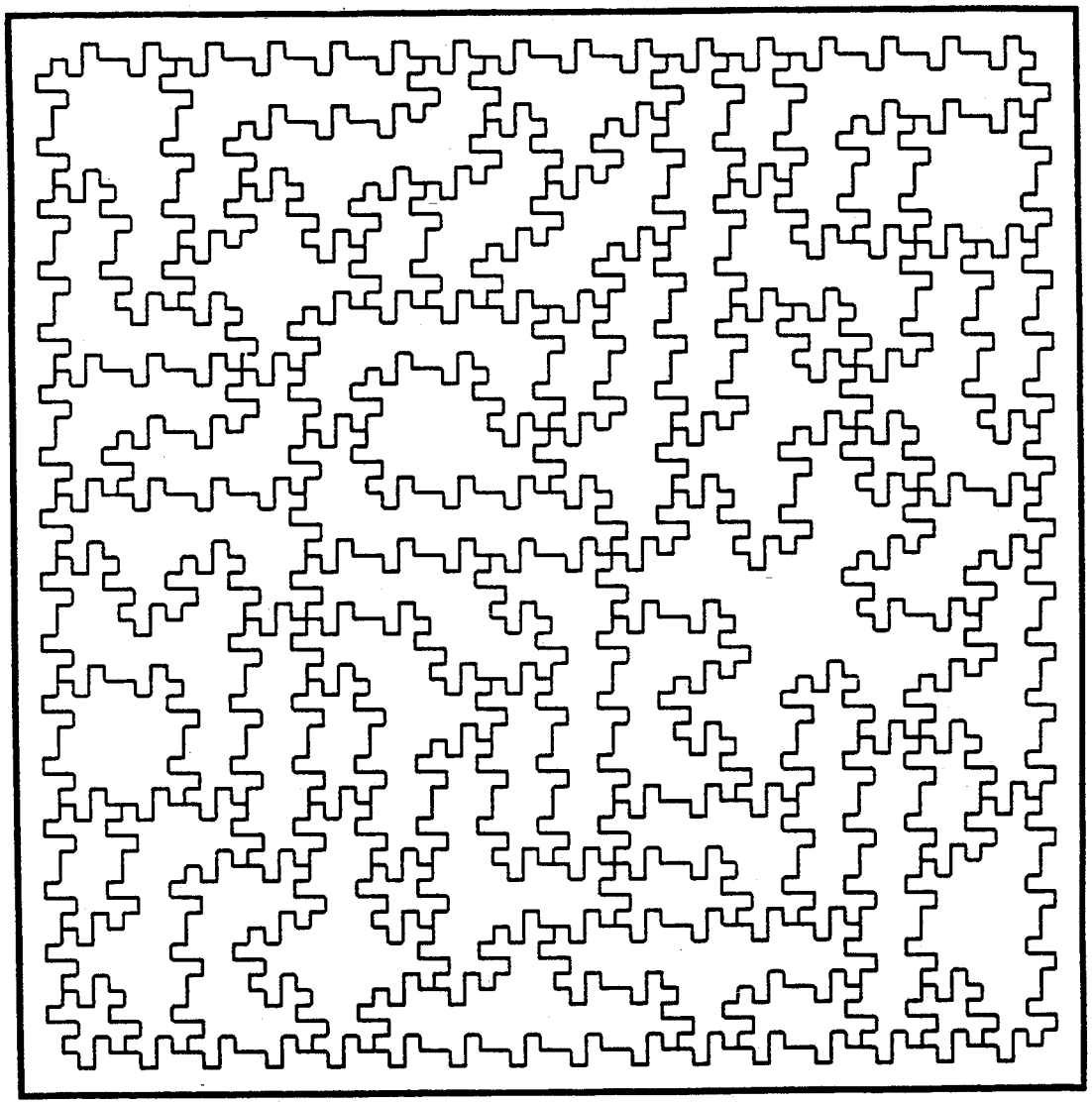

FIG. 26 shows yet another possible puzzle solution covering a larger (16×16) checkerboard with composite pieces formed from elemental shape 262. The pieces of FIG. 26 have varying numbers of elemental shapes ranging from one to sixteen.

The puzzles described above can be made from LPMPs using polarizing sheet materials as described below.

The above puzzles can also be made for display and solution on a computer screen, where the pieces are not physically realized but presented as graphic images that can be moved about on the screen. In a computer embodiment, only the outlines of the individual puzzle pieces would be rendered visible at the start, and these piece outlines would be arranged randomly as though the pieces had been dumped from a box. As the individual pieces are moved across the computer screen, where they overlap other pieces the modulo-two sum of the imbedded patterns would be made visible by the computer program in a manner analogous to the way it would appear if the pieces were made of polarizing material.

Figure 27:
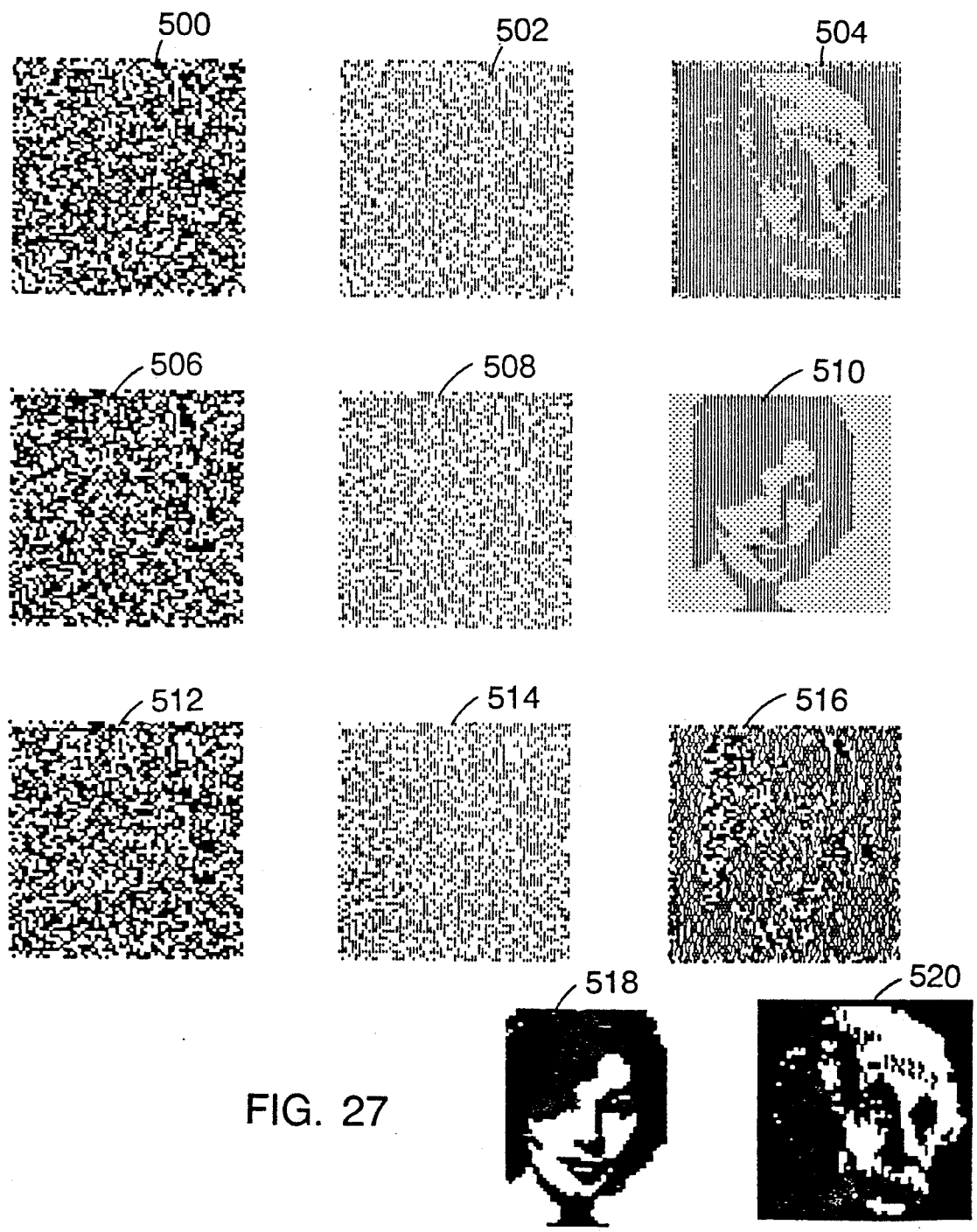
FIG. 27 shows interleaved enciphered data from two distinct images, and resulting images obtained with an overlapping light-polarizing mosaic at two different registrations.

FIG. 27 relates to an application of LPMPs wherein a first image is rendered visible at the point where the two mosaics are in registration and a second image is rendered visible when the registration point is shifted by one pixel in a specified direction.

Image 500 is the modulo-two sum of image 520 with random pattern FIG. 512. Image 506 is the modulo-two sum of image 518 with random pattern 512. Images 502, 508, 514 are all half-images of 500, 506 and 512 respectively. The half-images are created by dividing each cell of the full images into a left half and a right half and then discarding all the right halves, leaving a blank, unpolarized region between every half-pixel.

Image 516 is a composite formed by interleaving the two half-images 502 and 508.

When the image 516 is registered and modulo-two added to half-image 514, image 504 results.

When the image 516 is registered and shifted 1/2 cell to the left and modulo-two added to half-image 514, image 510 results.

In principle, the two images could be stereoscopic pairs. Following the geometric principles outlined earlier, the right eye of a viewer could be made to see only one of the images and the left eye only the other image. Thus the viewer could see a stereoscopic image without wearing glasses. Alternatively, the two images can be made so as to produce apparent motion as one slightly shifts eye position.

The interleaved image appears as a white background because it is aligned with the blank (unpolarized) portions of the overlying mosaic.

It is also possible to dissect the pixels in the horizontal and the diagonal directions, as well as in the vertical, as described above. In addition, it is possible to divide the pixels into more than two segments. For example, if a pixel is divided into three vertical segments, then three images can be multiplexed. Four images can be multiplexed into four divisions, and so on. A process is described below for multiplexing three images using a trisection, wherein each pixel is divided into three segments along a diagonal.

Figure 28A:
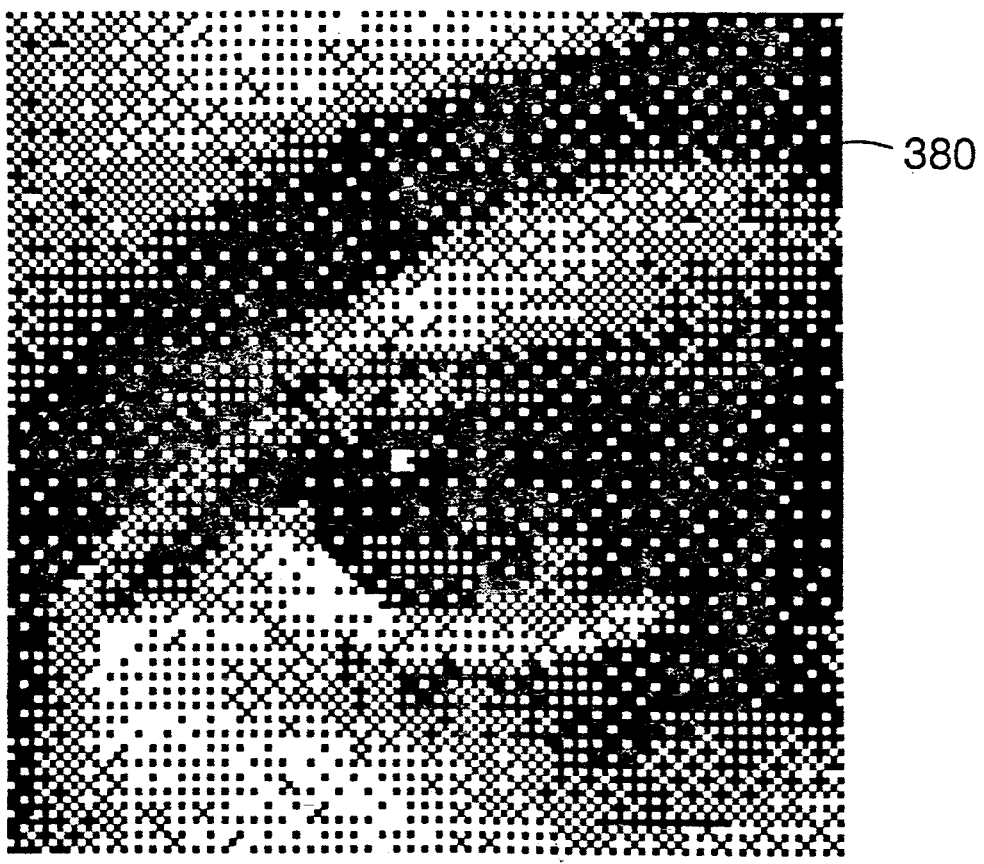

FIGS. 28A and 28B show three original images 380, 382, 384 consisting of 128×128 pixels and a random pattern 386 also having 128×128 pixels. FIG. 29 shows a small piece 388 of the random image and a small piece 390 of the graphic image of 389 enlarged several times. FIG. 29 also shows a 45 degree diagonal screen 392 where one out of three diagonal lines is dark, the remainder light.

Image 394 is the "logical and" product of 388 overlaid on 392. Image 396 is the "logical and" product of image 390 overlaid on image 392. The purpose of this figure is to show how an image consisting of square pixels can be trisected into smaller pixels along a diagonal. This is milar to the screening process used in halftone printing.

Figure 28A:
Figure 30A:
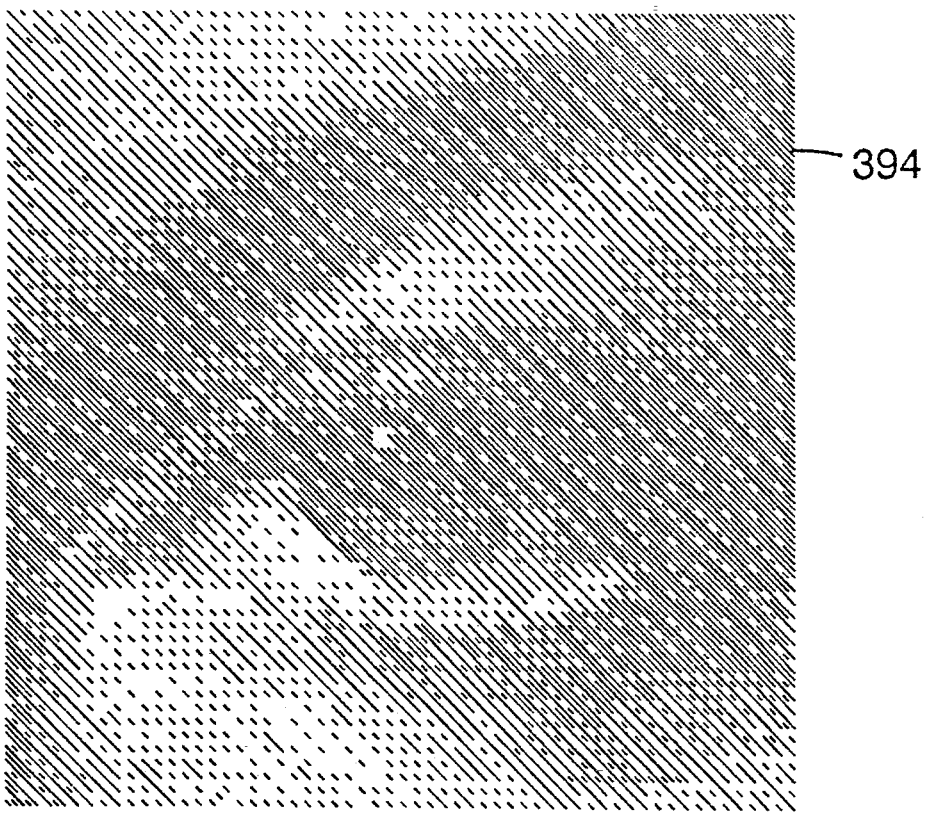
Figure 30A:
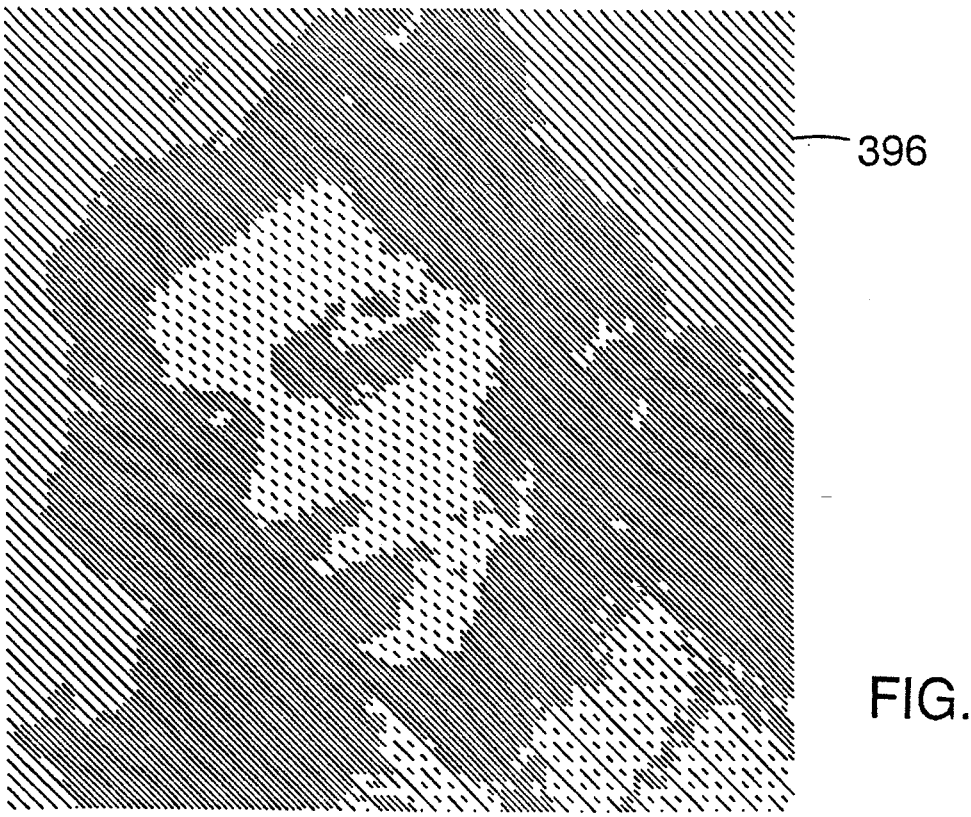
Figure 30B:
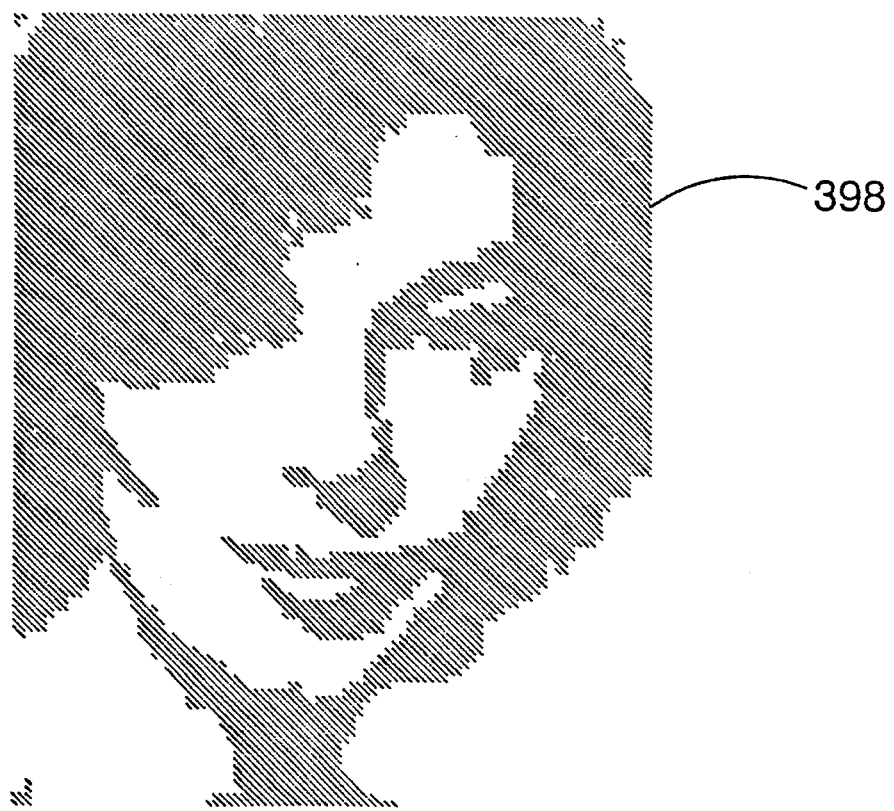
Figure 30B:
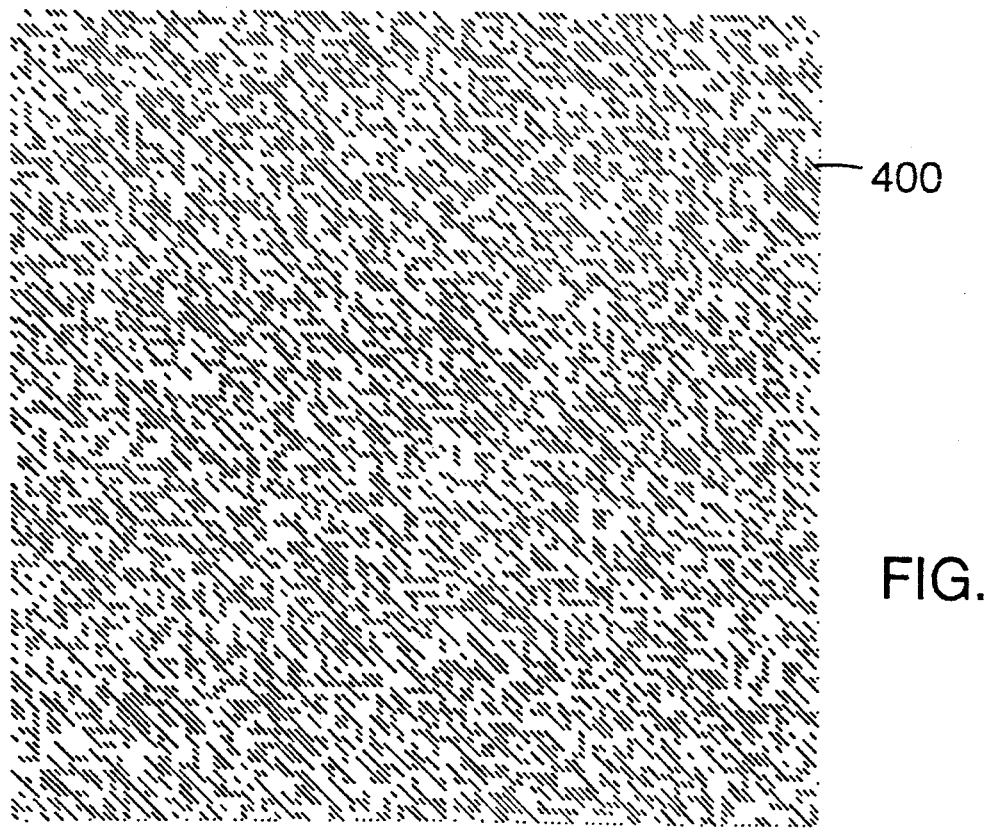
Figure 31A:
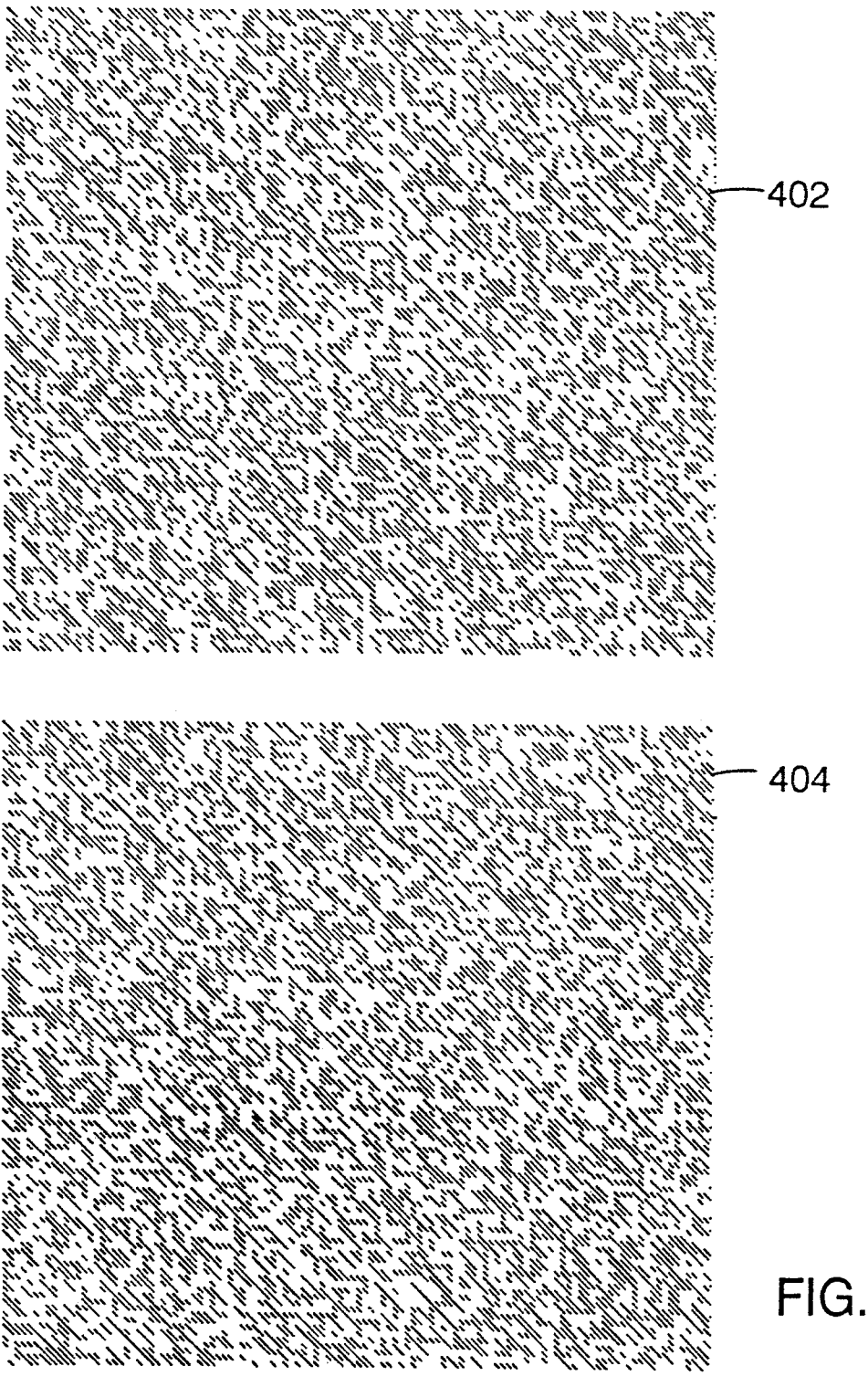
Figure 31B:
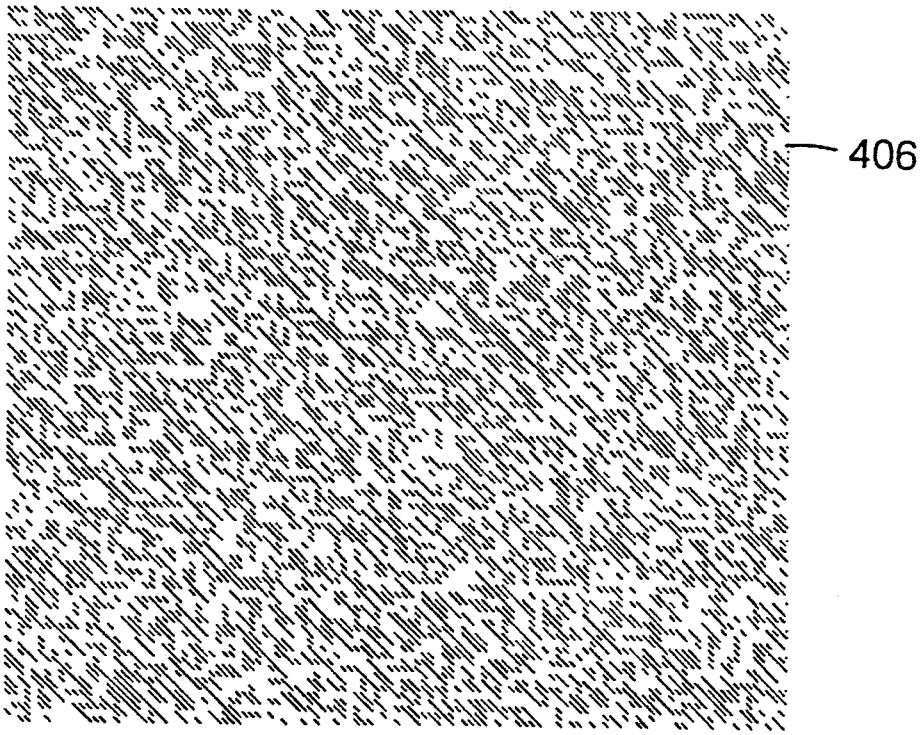
Figure 31B:
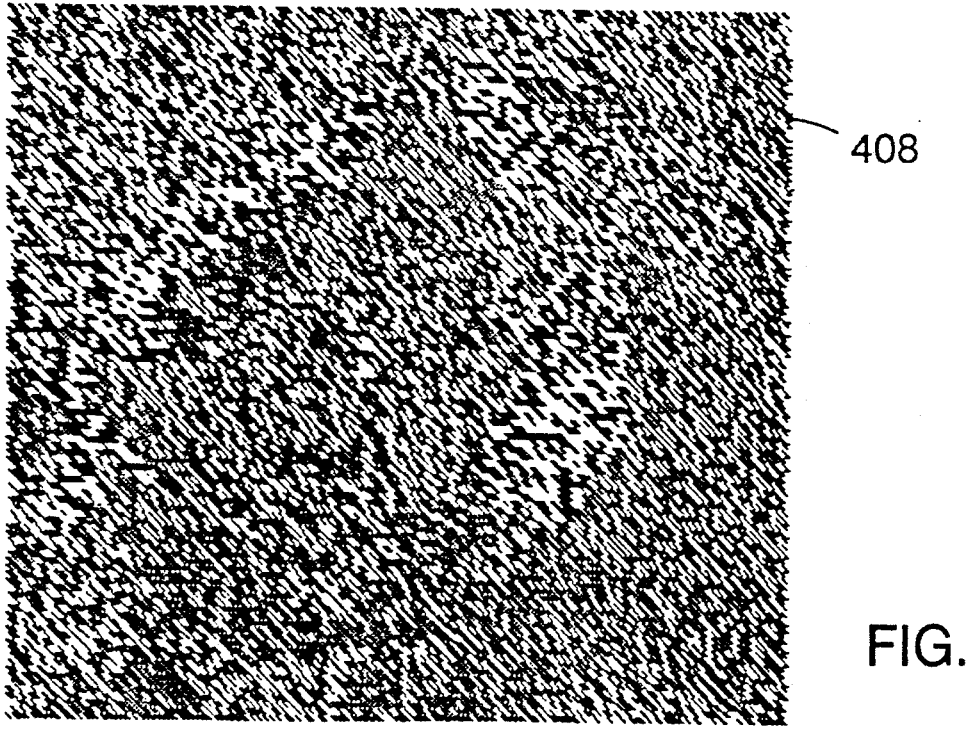

FIG. 30a and 30b show the three original graphic images (394, 396 and 398) and the random image 400 of FIG. 28 would appear after trisection as described above. FIGS. 31a and 31b show the results (402, 404, 406) of modulo-two addition of each of the graphic images of FIGS. 30a, 30b (394, 396, and 398) with the random image 400 of FIG. 30b. FIG. 31b shows the result of superimposing images 402, 404, 406 where image 404 is shifted one-third pixel to the right of image 402 and image 406 is shifted two-thirds pixel to the right. Image 408 and image 400 are the images to be cast into the light-polarizing mosaics in this example. Note that the two empty diagonals of 400 are not polarized.

Figure 32A:
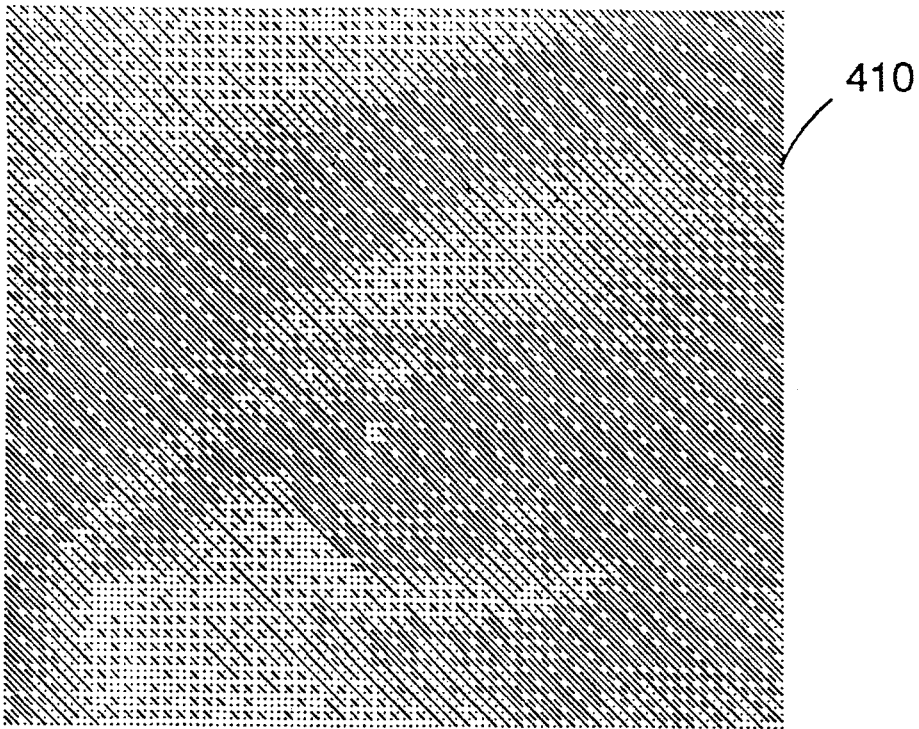
Figure 32A:
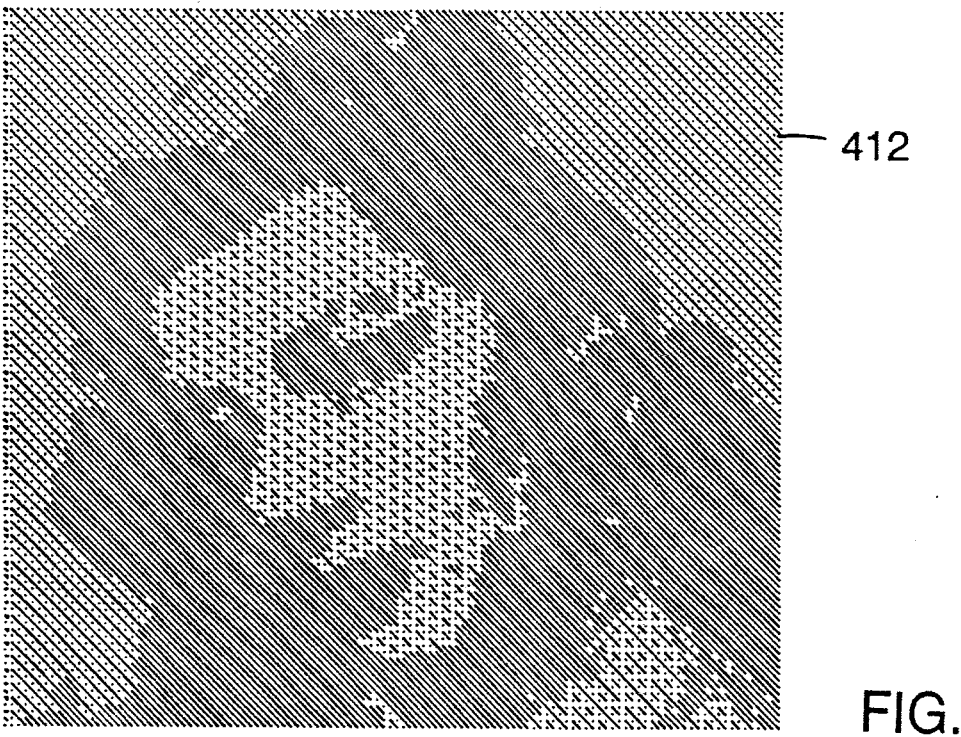
Figure 32B:
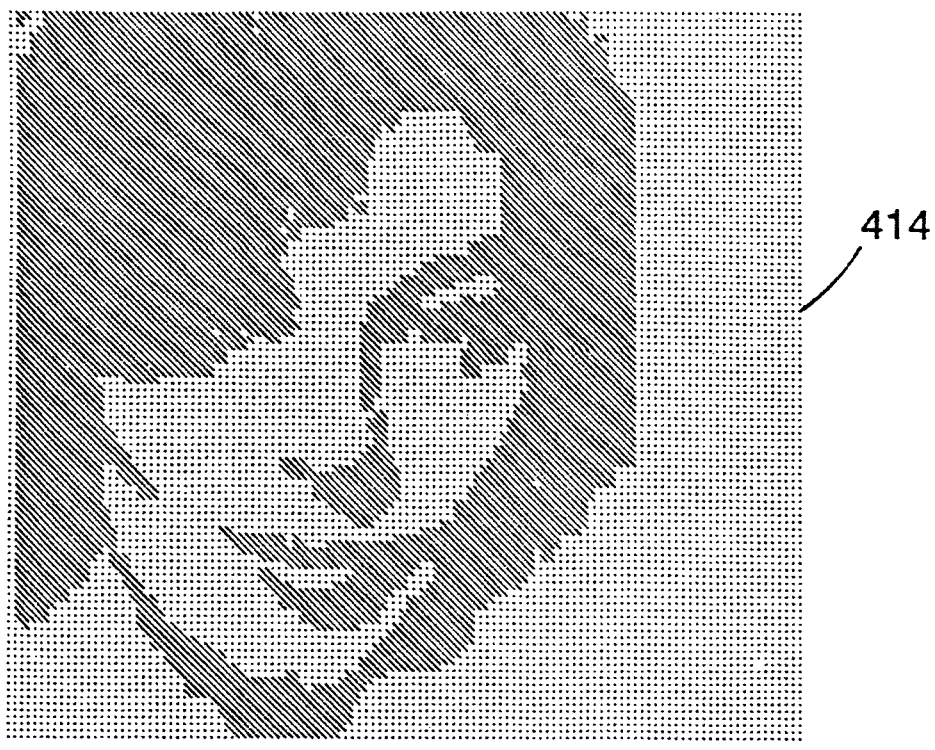
Figure 32B:
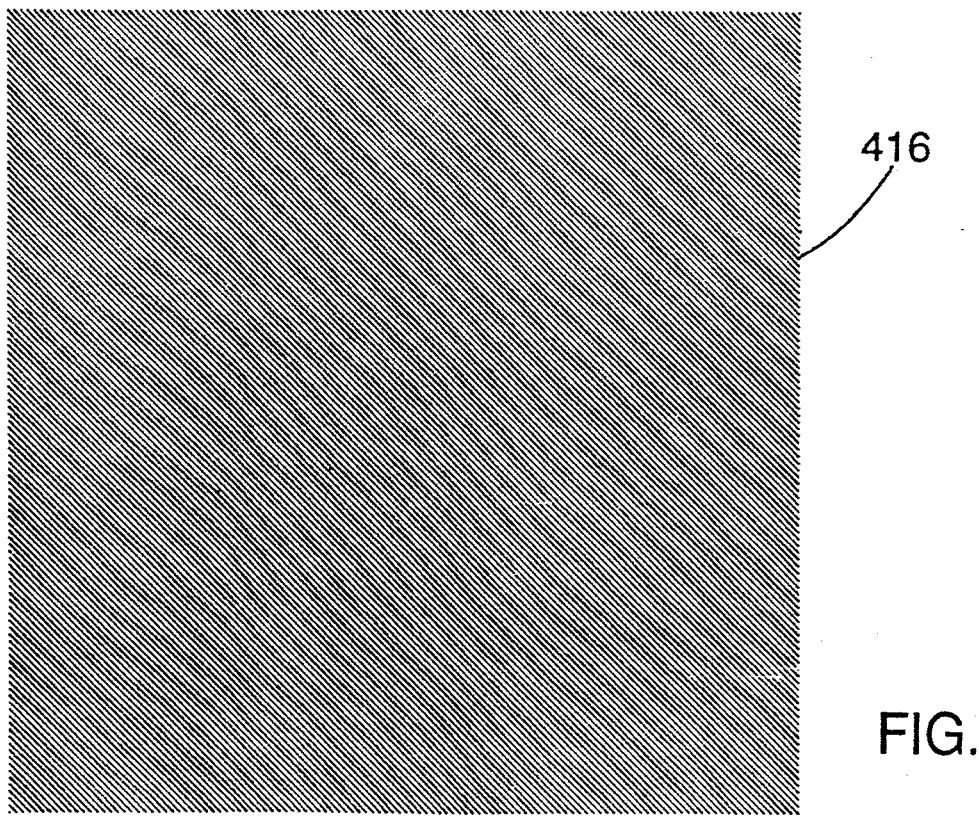

When the random mosaic 400 is overlaid and registered onto mosaic 408, the image 410 (FIG. 32a) will be observed. If the random mosaic is shifted one-third pixel to the right, image 412 will be observed; shifted two-thirds pixel to the right, image 414 (FIG. 32B) will be observed. Notice that 410, 412 and 414 are the same as the original images 394, 396 and 398.

Figure 33:

FIG. 33 shows how the three original trisected images 394, 396, and 398, would appear if superimposed/shifted. Image 408 is the enciphered equivalent of FIG. 33. Notice how much detail of the original imagery is still evident in the superimposed images compared with the enciphered version 408.

From the above examples of multiplexing two and three images into a light-polarizing mosaic pair by subdividing the pixels, it is obvious that four or more images can be multiplexed using a finer pixel subdivision. For a given size, there may be a practical limit to the process of pixel subdivision, but in principle there is no limit since the size of the light - polarizing mosaics may be made as large as desired.

So far in the above descriptions the light transmissive property of the light polarizing mosaic pair cell has been limited to two states, light and dark, equivalent to parallel or crossed polarizers. To achieve the appearance of gray tones in the imagery using only light/dark pixels requires using many smaller mosaic pixels to represent each image pixel, grayness being achieved by varying the ratio of light/dark mosaic pixels within each image pixel.

However, it is well known that the light transmitted by two polarizers varies as the square of the cosine of the angle between the polarization axes, "Malus' Law". (see "Optics", Eugene Hecht and Alfred Zajac, Addison-Wesley Pub Co., Reading, MA, 1974, p. 226.).

Shutters using electric fields, such as the Motorola 108A have transmission percentages that vary with the applied field voltage, on which the angle of polarization depends. The same is of course true for polarizing sheet material. Thus, in the case of light polarizing mosaic pairs, each pixel of the mosaic can be made to produce gray tones, following Malus' Law.

For example: to achieve shades of gray corresponding to transmission percentages of 0, 12.5, 25.0, 37.5, 50.0, 62.5, 75.0, 87.5, and 100%, the angles between polarization axes, according to Malus' Law, would be 90, 69, 60, 52, 45, 38, 30, 21, and 0 degrees.

A LPMP exhibiting gray shades in every pixel can be made using small chips of HN38S polarizing material in a number of ways. One example follows.

First, create a light polarizing mosaic where the cells have randomly assigned orientations, not only horizontal and vertical orientations. Create a second light polarizing mosaic where the end cell has the same orientation as in the first mosaic plus an additional angle corresponding to the desired shade of gray for that pixel in the image to be rendered visible when the mosaics are overlaid. When the two mosaics are overlaid and translated, random images having light, dark and intermediate shades in random pixels will be observed. When the two mosaics are registered, a coherent image having appropriate tones of gray in each pixel will be observed.

It is well known that certain materials have the property of rotating the angle of polarization of light by amounts that depend on the thickness of the material. These materials are called "retarders". Some materials, cellophane and stretched plastic sheet among them, have retarder properties that are dependent on the wave length of light in addition to thickness, which gives rise to so called "interference colors". (See "Optics", Eugene Hecht and Alfred Zajac, Addison-Wesley Pub Co., Reading, MA, 1974, p. 254).

This property, combined with polarizing sheets such as HN38S, has been often used to create colorful visual effects. For example, at the Museum of Science in Boston there is a colorful large scale artwork that employs cellophane-like materials as retarders sandwiched between polarizing sheet material.

It is evident that by inserting retarder materials of various thicknesses and orientations between the individual pixels of light-polarizing mosaic pairs, certain colorations of the pixels will result. If the two mosaics each have their pixels padded with various thicknesses of retarder material, and the polarizing sheets are restricted to only the horizontal and vertical orientations, then the colors of each pixel will in general change as the mosaics are translated one across the other, but the colors will in general not cover the full range of possible colors. To get a broader range of colors, the allowable crossing angles of polarizing sheet material must be enlarged to include angles other than 0 degrees and 90 degrees. The same is true to create shades of gray, as noted above.

A colored LPMP can be created in a manner similar to the method described above for gray shades.

First, for each pixel in the image to be rendered visible when the mosaics are overlaid, determine the thickness of retarder material and the angle between the polarizing axes of the two polarizing chips required to produce the desired color for that pixel. This is a cut and try process, given a particular retarder material.

Then create a light polarizing mosaic where the cells have randomly assigned orientations, not only horizontal and vertical orientations. Create a second light polarizing mosaic where each cell has the same orientations as in the first mosaic plus an additional angle as determined above in the colorizing process. Create a third and a fourth mosaic wherein each cell is formed not of polarizing material but of retarder material that produces interference colors. The sum of retarder material thicknesses in the third and fourth mosaics are then attached to the polarizing mosaics, one to each mosaic, so as to be between the two light polarizing mosaics when in proper registration. (A single retarder mosaic attached to one polarizing mosaic will also suffice.)

As the two colorized light polarizing mosaics are translated over each other, the colors and densities of each pixel will vary randomly until the two mosaics come into registration. Then a colorized, coherent image will appear.

One way to make a light-polarizing mosaic is to cut a sheet of polarizing material such as Polaroid HN38S or HNCP37 into small square chips the size of the pixels in the mosaic and then to affix the square chips in the desired orientations onto a transparent substrate such as glass in the manner of tiling a floor. To accomplish this task, a person would need to view the chips through polarizing material, for example polaroid sunglasses, in order to see the direction of the axes of polarization of each square as the tiling process proceeds.

A second and less labor-intensive method of preparing a polarizing mosaic is to deposit many pixels at once onto a large sheet of polarizing material using a Polaroid product called Vectograph film, which heretofore has been used for the production of transparencies for viewing 3-dimensional images. Vectograph film is a single sheet coated on one side with a polarizing substance oriented with its axis of polarization in one direction and on the other side coated with the polarizing axis in the transverse direction. Until the polarizing substance is stained with a dye, however, the coatings are non-polarizing; that is, light of any polarization can pass through the entire sheet. If both sides are stained, the entire sheet becomes opaque because the two coatings become crossed polarizers.

Figure 9:
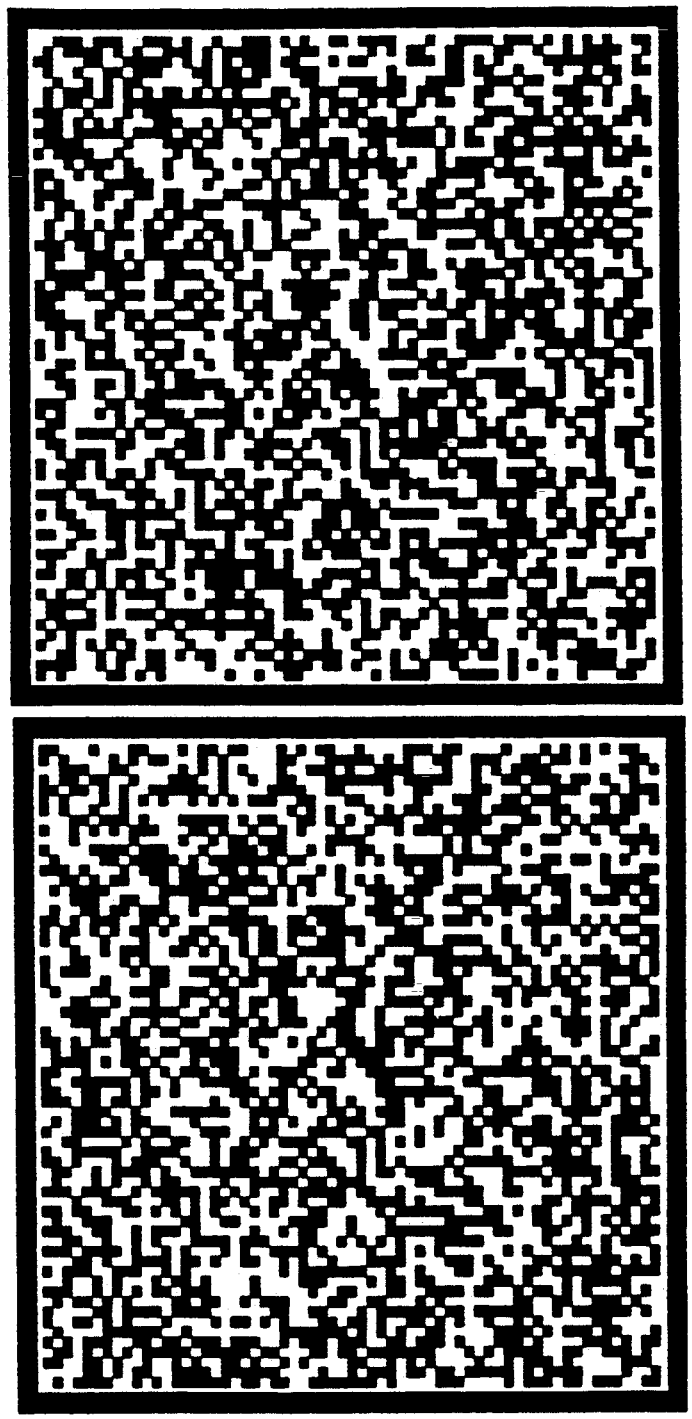
FIG. 9 shows a film positive and a film negative of the binary data of FIG. 5, which are used in the production of a light-polarizing mosaic.

To produce a light-polarizing mosaic, both sides of a Vectograph sheet must be stained by a printing process which results in certain pixels having horizontal polarization axes and the remaining pixels having vertical polarization axes. The desired result is a thin sheet (0.010" thick) having certain pixels, defined by the stain pattern on one side, each behaving as a polarizer of light with axis in the "0" direction, and the remaining pixels, defined by the stain pattern on the other side, each behaving as a polarizer of light with axis in the transverse "1" direction. The process of applying the stain selectively to the Vectograph material is fully described in the Polaroid Corporation brochure titled: *Polaroid Black and White Vectograph Images: A Guide,* in which a printing matrix employing Kodak Matrix Film Type 4150 is prepared 5 matrix from a pair of photographic transparencies depicting the patterns of stain to be applied to the two sides of the Vectograph sheet. FIG. 9 shows the pair of transparencies that would be used in the Vectograph process to produce a light-polarizing mosaic in the style of the present invention.

A third method of creating the light-polarizing mosaic uses liquid crystals controlled by electric signals.

The effect of a thin film of nematic liquid crystal (LC) substance on the polarization axis of polarized light is well known and widely exploited in LCD (liquid crystal display) technology. This effect can be characterized most simply as a rotation of the axis of polarization by 90 degrees as the light passes through the film. However, when the film of liquid crystal is stressed by an electric field parallel to the rays of light, the axis of polarization is rotated a further 90 degrees by the LC film. This permits the modulation of the axis of polarization over a small area of liquid crystal film (a pixel) by an electrical signal. In the practice of making displays for calculators and computers and clocks etc, the LC effect is used to create visible light and dark regions (pixels) in the following way: unpolarized light is first passed through a polarizing sheet and the resulting plane (or circular) polarized light is then passed through the LC film, where the axis of polarization is rotated 90 degrees, and then through a second polarizing sheet having axis perpendicular to that of the first sheet. Because the LC film rotated the axis 90 degrees, light that passed through the first polarizing sheet also passes through the second transverse polarizer. If an electric field is applied across selected regions (pixels) of the LC film, those regions further rotate the axis of polarization by an additional 90 degrees, and now light passing through those regions of the LC film will no longer pass through the second polarizer, resulting in the appearance of a dark region (pixel). This is the desired result for making visual displays that can be easily driven by computer circuitry, the chief advantage of LC displays being that they consume only minuscule amounts of power. However, for the present purposes of making a light-polarizing mosaic, the conventional LC display must be modified by removing the second polarizer.

Figure 12:
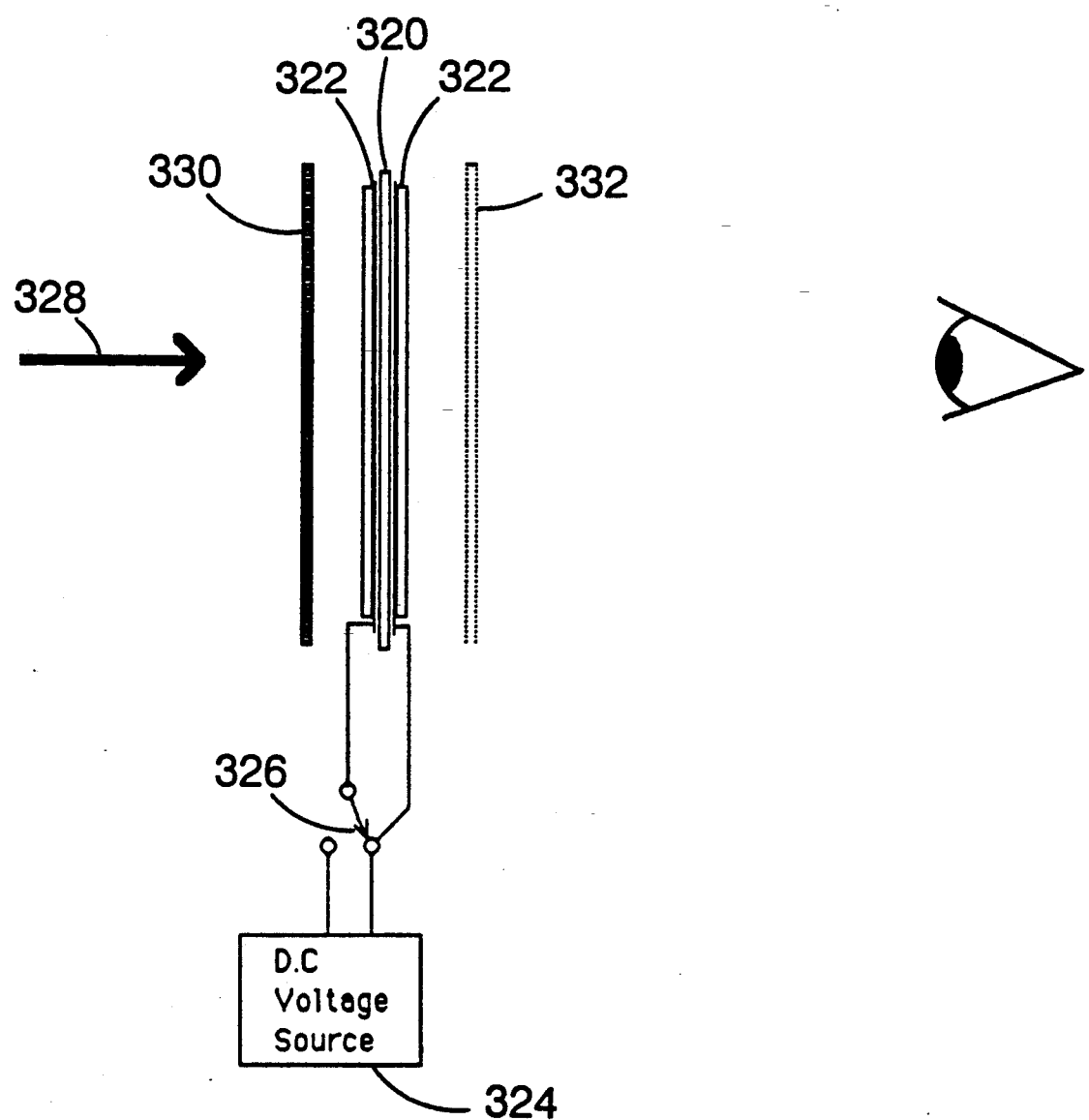
FIG. 12 shows edge-on and schematically the principal elements of a single pixel liquid crystal display and shows the piece to be removed in order to create one cell of a light-polarizing mosaic.
Figure 13:
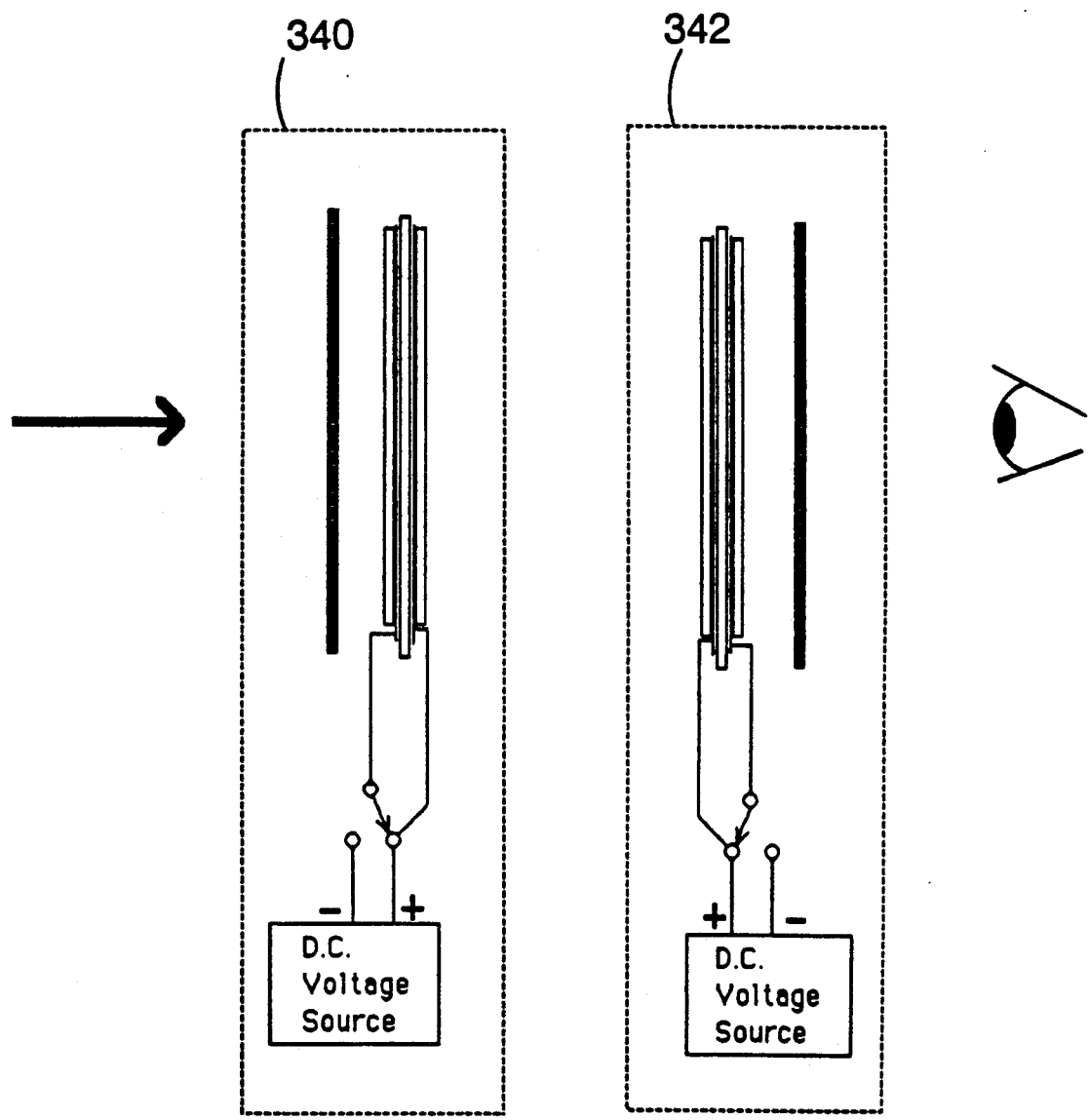
FIG. 13 shows two liquid crystal light-polarizing mosaic cells acting as a pair to perform the modulo-two addition function.

FIG. 12 shows one pixel of a light-polarizing mosaic using a modified transmissive LCD cell, as might be found in a computer output display of the Kodak Datashow HRM, which was originally designed for the purpose of projecting computer data onto a screen using a "viewgraph" "overhead" projector. FIG. 13 shows two such modified LCD cells in the arrangement required to create a light-polarizing mosaic pair.

The liquid crystal display device generally takes the form of a thin layer of liquid crystal material (320) sandwiched between two sheets of glass that are coated with a thin, transparent electrically conductive material on the faces next to the liquid crystal (322). A conductive path is established between the glass coatings and a source of voltage (324) by way of a binary switching mechanism (326). A transmissive type LCD is illustrated in FIG. 12 where light (328) passes through a first polarizer (330), then through the LCD sandwich where it undergoes a 90° rotation of the polarization axis, and this prevents the light from passing through the second polarizer. In practice, liquid crystal devices manufactured with one cell are known as liquid crystal shutters; also they are manufactured with an array of many small independently actuated cells on a single substrate and are used to form binary images of text and graphics, and are known as liquid crystal displays (LCD).

By removing the second polarizer (332) a liquid crystal shutter becomes a cell of a light-polarizing mosaic, and a liquid crystal display becomes a complete light-polarizing mosaic. FIG. 13 shows two such light-polarizing mosaic cells (340) and (342) forming a cell of a mosaic pair. A liquid crystal light-polarizing mosaic derived from an LCD can likewise be paired with another light-polarizing mosaic of the same type or of another type such as the Vectograph type.

Figure 14:
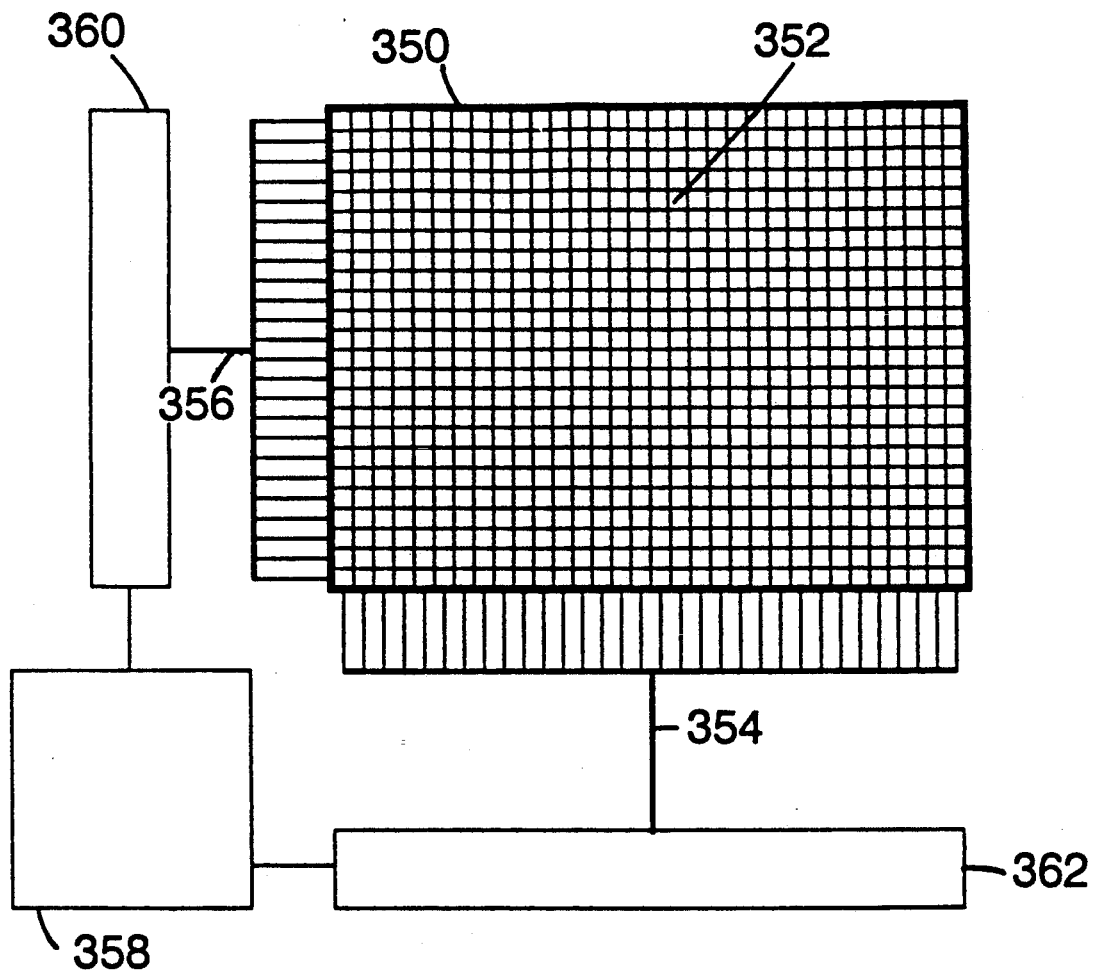
FIG. 14 shows a pair of light polarizing mosaics comprising arrays of LCD cells as described in FIG. 13, together with control circuitry for setting the states of the individual cells. Dark and light cells are not distinguishable because the second polarizing filter is not present in either array.

FIG. 14 shows a rectangular array (350) of LCD cells (352) of the type of FIG. 13. The polarization state of a given cell is set by electrical signals recurring briefly and simultaneously on the row and column address lines (354, 356) pertaining to that particular cell. Data regarding the state of each cell is contained in a memory device which is part of control element 358. Controller 358 is connected to the row address line control element 360 and to column address line controller 362. Controller 358 causes the address lines to set the states of all cells, one at a time and in sequence. A device as in FIG. 14, which is a light polarizing mosaic, can be made by removing one of the polarizing layers from an LCD computer data projection device such as the Kodak "Datashow HRM."

Figure 15:
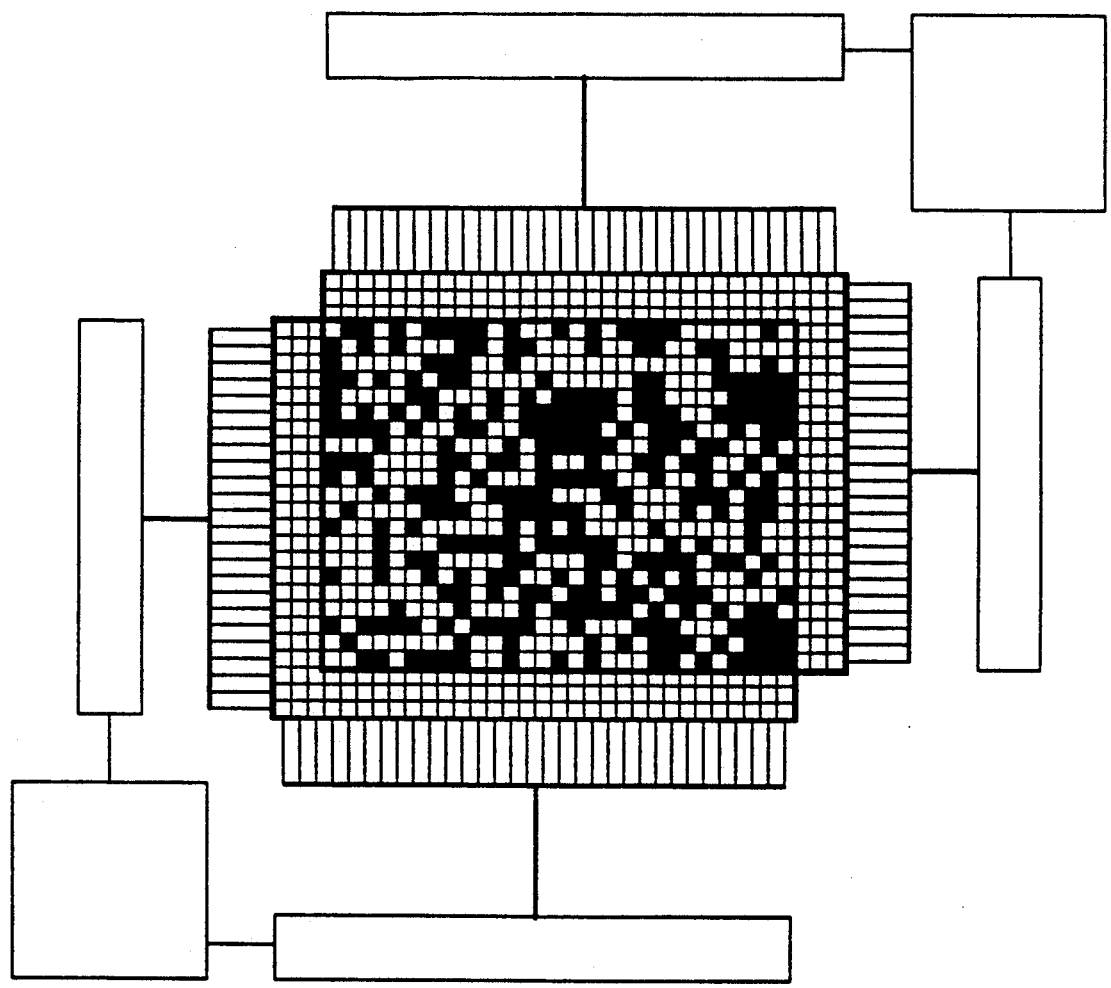
FIG. 15 shows two such cells of FIG. 14 in partial overlap, the modulo-two sums of the overlapped cells being revealed as dark and light regions.

FIG. 15 shows two light-polarizing mosaics of the type of FIG. 14. In the figure the two mosaics are partially overlapped, and in the region of overlap a pattern of dark and light cells is evident. No pattern of dark and light cells is evident in the individual mosaics because in each mosaic a second polarizing layer has been removed.

Three distinct ways to produce a light-polarizing mosaic have been described above. An effective light polarizing mosaic pair may also be created using two mosaics of different types, such as by laying an array of HNCP37 polarizing chips over an LCD type mosaic.

In addition to LCD cells there are other light-shuttering devices using polarized light that can be modified to create a light-polarizing mosaic cell by removing the second polarizer, the well known Kerr cell and Pockels cell, for examples. These use an electric field applied across a liquid or a crystal, respectively, to modulate the plane of polarization of light passing through the medium. Newer versions of the Pockels cell employ electro-optic ceramics such as PLZT, the "Solid Ceramic Shutter SCS 1108A" made by Motorola Inc. of Albuquerque, NM, for example. Another example that uses light polarizing features of ferro-electric liquid crystals is the LV500A Light Valve made by Displaytech Inc. of Boulder, Colorado. Kerr and Pockels cells are described in "Optics", Eugene Hecht and Alfred Zajac, Addison-Wesley Pub Co., Reading, MA, 1974, p. 263.

Other embodiments are within the scope of the following claims.

What is claimed is:

1. Apparatus comprising
a first group of polarizing elements whose polarization axes are respectively oriented to represent a first set of values, and
a second group of polarizing elements whose polarization axes are respectively oriented to represent a second set of values, said second set of values being derived from said first set of values and from corresponding values of a third set in a manner such that when said first group of polarizing elements and corresponding elements of said second group of polarizing elements are superimposed, a visible pattern appears which corresponds to said third set of values.

2. The apparatus of claim 1 wherein said first group of polarizing elements and said second group of polarizing elements lie respectively in two planes.

3. The apparatus of claim 1 wherein said first group of polarizing elements and said second group of polarizing elements are respectively organized as arrays.

4. The apparatus of claim 1 wherein said elements comprise rectilinear regions.

5. The apparatus of claim 4 wherein said elements comprise squares arranged in rows and columns.

6. The apparatus of claim 1 wherein said values comprise bits and the value of each bit is represented by orienting the polarization axis in either of two orientations.

7. The apparatus of claim 6 wherein said orientations are perpendicular to one another.

8. The apparatus of claim 1 wherein each said value in said second set is derived by modulo-two addition of the corresponding values in said first and third set.

9. The apparatus of claim 1 wherein said first set of values are selected randomly.

10. The apparatus of claim 1 wherein said third set of values represent an image.

11. The apparatus of claim 1 wherein said first and second groups of polarizing elements are arranged as transparent sheets.

12. The apparatus of claim 1 wherein said first and second groups of polarizing elements are formed as electrically controllable liquid crystals.

13. The apparatus of claim 1 wherein said first and second groups of polarizing elements are formed as mosaics of polarizing pieces mounted on a transparent substrate.

14. The apparatus of claim 1 wherein said first and second groups of polarizing elements are formed by a photographic process as polarizing regions on opposite faces of a transparent film.

15. The apparatus of claim 1 wherein said first and second groups of polarizing elements are respectively formed in two different media selected from among the following:
mosaics of polarizing pieces mounted on a transparent substrate;
electrically controlled liquid crystals; and
polarizing regions formed by a photographic process on a transparent film.

16. The apparatus of claim 1 wherein said polarizing elements of said first group have the same sizes and shapes as the corresponding polarizing elements of said second group.

17. The apparatus of claim 1 wherein said polarizing elements of said first group have the same shapes but different scales as the corresponding polarizing elements of said second group.

18. The apparatus of claim 17 further comprising supports to mount said first and second groups respectively in planes that are spaced apart by a distance which corresponds to the degree of scaling.

19. The apparatus of claim 1 wherein said first and second groups of polarizing elements are arranged respectively as two concentric transparent cylinders.

20. The apparatus of claim 1 wherein said first and second groups of polarizing elements are arranged respectively as two transparent sheets each of which is precut to form puzzle-like pieces.

21. The apparatus of claims 1 wherein said first group of polarizing elements are arranged in a first matrix of cells, each element occupying no more than half of its cell, and
said second group of polarizing elements are arranged in a second matrix of cells, said second group of elements comprising subgroups whose polarization axes are respectively oriented to represent subsets of said second set of values, said subgroups occupying non-overlapping portions of said cells of said first matrix in a manner such that when said first group of polarizing elements and corresponding elements of different subgroups of said second group of elements are registered, different visible patterns appear which correspond to respective subsets of said third set.

22. The apparatus of claim 21 wherein said subsets of said third set correspond to different images, and when different subgroups of said second groups of elements are registered with said first group of elements, said different images respectively become visible.

23. The apparatus of claim 1 wherein the visible pattern which corresponds to said third set of values is a discernable image.

24. Apparatus comprising
a first array of polarizing regions on a transparent sheet, each region in said first array having tis polarization axis oriented to represent the value of a randomly selected bit, and
a second array of polarizing regions on a transparent sheet, each region in said second array having its polarization axis oriented to represent the value of a bit belonging to a second set of bits,
each bit of said second set of bits being derived from a corresponding one of said randomly selected bits and a corresponding bit of an image.

25. A method comprising
forming a first group of polarizing elements whose polarization axes are respectively oriented to represent a first set of values,
deriving a second set of values from the first set of values and from corresponding values of a third set, and
forming a second group of polarizing elements whose polarization axes are respectively oriented to represent said second set of values,
said second set being derived in a manner such that when said first group of polarizing elements and said second groups of polarizing elements are superimposed, a visible pattern appears which corresponds to said third set of values.

* * * * *

UNITED STATES PATENT AND TRADEMARK OFFICE
CERTIFICATE OF CORRECTION

PATENT NO.   : 5,101,296
DATED        : March 31, 1992
INVENTOR(S)  : Bill Bell

It is certified that error appears in the above-identified patent and that said Letters Patent is hereby corrected as shown below:

```
Column 5, line 36, delete entirely.

Column 5, line 37, delete "signed" before "to the".

Column 7, line 64, "2!0" should be --210--.

Column 11, line 21, insert --19-- after "FIG".

Column 12, line 12, "5!4," should be --514,--.

Column 12, line 49, "milar" should be --similar--.

Column 12, line 54, insert new paragraph after "above".

Column 13, line 32, "108A" should be --1108A--.

Column 15, line 21, delete "5 matrix".

Column 18, line 19, "claims" should be --claim--.

Column 18, line 43, "tis" should be --its--.
```

Signed and Sealed this

Fifteenth Day of March, 1994

Attest:

BRUCE LEHMAN

Attesting Officer          Commissioner of Patents and Trademarks